US012771890B2

(12) United States Patent
Bloch et al.

(10) Patent No.: US 12,771,890 B2
(45) Date of Patent: Oct. 20, 2026

(54) AUTOMATIC POST-PRODUCTION FOR PRODUCT VIDEOS

(71) Applicant: JBF Interlude 2009 LTD, Tel Aviv (IL)

(72) Inventors: Jonathan Bloch, Ramat HaSharon (IL); Tal Zubalsky, Brooklyn, NY (US); Yuval Hofshy, Kfar Saba (IL); Alon Benari, Brooklyn, NY (US); Eyal Avital, Afek (IL); Tomer Lahav, Tel Aviv (IL); Roy Taragan, Tel Aviv (IL)

(73) Assignee: JBF Interlude 2009 LTD, Tel Aviv (IL)

( * ) Notice: Subject to any disclaimer, the term of this patent is extended or adjusted under 35 U.S.C. 154(b) by 0 days.

(21) Appl. No.: 18/504,390

(22) Filed: Nov. 8, 2023

(65) Prior Publication Data

US 2025/0150660 A1 May 8, 2025

(51) Int. Cl.

*H04N 21/254* (2011.01)
*G06V 10/25* (2022.01)
*H04N 21/234* (2011.01)
*H04N 21/4725* (2011.01)

(52) U.S. Cl.

CPC ......... *H04N 21/2542* (2013.01); *G06V 10/25* (2022.01); *H04N 21/23418* (2013.01); *H04N 21/4725* (2013.01)

(58) Field of Classification Search

CPC ......... H04N 21/2542; H04N 21/23418; H04N 21/4725; G06V 10/25

See application file for complete search history.

(56) References Cited

U.S. PATENT DOCUMENTS 10,755,747 B2 8/2020 Bloch et al.
11,170,044 B2 11/2021 Kozhaya et al.
11,683,290 B1 * 6/2023 Stern .................... H04L 63/126 726/13
11,922,675 B1 * 3/2024 Saraee .................. G06N 3/094
12,142,027 B1 * 11/2024 Saraee .................. G06N 3/045

(Continued)

FOREIGN PATENT DOCUMENTS

CN 115689120 A 2/2023

OTHER PUBLICATIONS

Raheem, H. A. et al., Recommender Systems for E-commerce in online video advertising: Survey, 2021 International Conference on Advanced Computer Applications (ACA2021), Imam ALKadhum College, Maysan, pp. 68-73, (2021).

(Continued)

*Primary Examiner* — Sumaiya A Chowdhury
(74) *Attorney, Agent, or Firm* — Goodwin Procter LLP

(57) ABSTRACT

A method for providing automatic editing of a product video including receiving product video footage associated with a product, generating a feature list including a plurality of features of the product, assigning different portions of the product video footage to each feature of the plurality of features, creating a plurality of product artifacts from the portions of the product video footage assigned to each of the plurality of features, receiving a deliverable requirement list defining requirements for at least one media deliverable, and generating the at least one media deliverable using the plurality of product artifacts based on the deliverable requirement list.

28 Claims, 22 Drawing Sheets

(56) References Cited

U.S. PATENT DOCUMENTS

| | | | | |
|---|---|---|---|---|
| 2008/0101768 | A1* | 5/2008 | Smith | H04N 5/782 386/E9.037 |
| 2010/0050083 | A1 | 2/2010 | Axen et al. | |
| 2016/0217328 | A1 | 7/2016 | Yanai et al. | |
| 2017/0287040 | A1 | 10/2017 | Li et al. | |
| 2021/0117471 | A1* | 4/2021 | Rav-Acha | G06F 16/7837 |

OTHER PUBLICATIONS

Chen, W. et al., Automatic Web-based EFP Studio System with XML Documents, 2012 26th International Conf. on Advanced Information Networking and Applications Workshops, Fukuoka, Japan, (2012) pp. 154-159.

* cited by examiner

| ID | Name | Description |
|---|---|---|
| 989802-2 | One Hand Fold | Deliver a true one-hand, easy fold |
| 989802-3 | Lightweight | Super simple lightweight |
| 989802-4 | Angle Adjustment | Adjust the footrest to achieve the perfect fit |
| 989802-5 | Anti-Vibration | Safe smoothly free from bumps with Anti-shock design and the shock-absorbing |
| 989802-6 | Storage basket | The storage basket under the seat are suitable for everything |

FIG. 3A

| Feature_id | Feature | Description |
|---|---|---|
| 6542-1 | Side Impact Protection | The car seat has built-in technology in the headrest to provide cushioning and protection for a child's head in the event of a side impact crash. |
| 6542-2 | Shoulder Harness | The harness and headrest height can be easily adjusted with one click to accommodate a growing child, ensuring a secure and comfortable fit. |
| 6542-3 | Premium Fabrics | The car seat is designed with soft-to-touch cushions and premium fabrics and padding throughout to provide supreme comfort for a child during the journey. |
| 6542-4 | Removable Pillows | The car seat comes with a removable infant head pillow and lumbar cushion to provide extra support for smaller babies and ensure a comfortable fit for all ages. |
| 6542-5 | Front-Facing | Displaying a convertible car seat in forward-facing toddler mode with minimum recline, without infant head pillow and lumbar cushion. |
| 6542-6 | Rear-Facing Infant | Showcasing the convertible car seat in rear-facing newborn mode, featuring maximum recline, infant head pillow, lumbar cushion, and wedge for smaller babies. |
| 6542-7 | Booster | Presenting the convertible car seat in booster mode for older children, without harness and with the headrest at maximum position. |
| 6542-8 | Cup Holders | Includes 2 easy-to-remove and dishwasher safe cup holders. |

FIG. 3B

| Shot_id | Description |
| --- | --- |
| 7891-1 | Scan the product from bottom to top spiraling around it. Forward-facing toddler mode with medium recline, with infant head pillow, and lumbar cushion. head rest low position. |
| 7891-2 | Signature shot of product in mode: forward-facing toddler mode with minimum recline, remove infant head pillow, and lumbar cushion. Head rest medium position. |
| 7891-3 | Signature shot of product in mode: booster mode for older children, without harness, headrest maximum position |
| 7891-4 | Scan the product from bottom to top spiraling around it. Forward-facing toddler mode with minimum recline, remove infant head pillow, and lumbar cushion. head rest medium position. Harness is set on harness holders to keep straps out of the way |
| 7891-5 | {reshoot) signature shot of product in mode: forward-facing toddler mode with minimum recline, remove infant head pillow, and lumbar cushion.<br>Head rest medium position.<br>The previous shot wasn't minimum recline, it was medium. Please make sure there's no recline at all |
| 7891-6 | Signature shot of product in mode: rear-facing newborn mode it features maximum recline, an infant head pillow, lumbar cushion, and wedge for smaller babies. Head rest lowest position |

FIG. 3C

500

| Feature (502) | Mode (504) | Video (506) | In Time (508) | Out Time (510) | Zoom (512) | Left upper box (514) | Box Size (516) |
|---|---|---|---|---|---|---|---|
| Storage basket | All | AB13- fully extended | 00:12.31 | 00:21.14 | X3 | 150:134 | 70X120 |
| Storage basket | All | AB15- half reclines | 01:05.00 | 01:12.30 | X6 | 350:200 | 80X140 |
| Easy fold | Car seat | AC6 - car | 01:05.00 | 01:12.30 | X3 | 150:426 | 120x90 |
| Easy fold | Car seat | AC6 - car | 01:07.00 | Picture | X3 | 150:426 | 120x90 |
| Safety harness | Car seat | AC6 - car | 0:43:12 | 01:02.2 | X1 | 0:00 | 280:300 |

FIG. 5

AUTOMATIC POST-PRODUCTION FOR PRODUCT VIDEOS

TECHNICAL FIELD

The following disclosure is directed to systems and methods for editing product videos and, more specifically, providing automatic post-production editing of product videos.

BACKGROUND

Product videos are often used to showcase a particular product, highlighting its features, benefits, and use cases. These videos can be used for marketing purposes to promote and sell the product to potential customers. Product videos can take various forms, including live-action videos, animated videos, 3D renderings, and demonstrations. They can be created by companies, marketers, and/or individuals, and are often shared on social media, websites, and other online platforms to generate buzz and increase sales. The goal of a product video is to provide viewers with a clear understanding of what the product is, how it works, and why they should buy it. However, the post-production editing of such product videos can be a lengthy, manual process that varies based on product type. In many cases, the post-production editing process includes contributions from different individuals or teams.

SUMMARY

At least one aspect of the present disclosure is directed to a method for providing automatic editing of a product video. The method includes receiving product video footage associated with a product, generating a feature list including a plurality of features of the product, assigning different portions of the product video footage to each feature of the plurality of features, creating a plurality of product artifacts from the portions of the product video footage assigned to each of the plurality of features, receiving a deliverable requirement list defining requirements for at least one media deliverable, and generating the at least one media deliverable using the plurality of product artifacts based on the deliverable requirement list.

In some embodiments, generating the feature list includes receiving product metadata data corresponding to the plurality of product features and generating the feature list based on the product metadata. In some embodiments, generating the feature list includes analyzing the product video footage to derive product metadata corresponding to the plurality of product features and generating the feature list based on the product metadata. In some embodiments, assigning different portions of the product video footage to each feature of the plurality of features includes assigning at least one timecode of the product video footage to each feature of the plurality of features.

In some embodiments, assigning different portions of the product video footage to each feature of the plurality of features includes assigning at least one video coordinate of the product video footage to each feature of the plurality of features. In some embodiments, the at least one video coordinate indicates a region of the product video footage where the corresponding feature is displayed. In some embodiments, the method includes assigning dimensions of a box to the at least one video coordinate. In some embodiments, the box encompasses a region of the product video footage where the corresponding feature is displayed.

In some embodiments, generating the at least one media deliverable using the plurality of product artifacts based on the deliverable requirement list includes integrating at least one infographic with at least one product artifact. In some embodiments, generating the at least one media deliverable using the plurality of product artifacts based on the deliverable requirement list includes integrating at least interactive element with at least one product artifact. In some embodiments, the at least one media deliverable includes at least one image. In some embodiments, the at least one media deliverable includes at least one video. In some embodiments, the at least one media deliverable includes at least one interactive video. In some embodiments, the at least one media deliverable includes two or more artifacts from the plurality of artifacts arranged in a sequence.

Another aspect of the present disclosure is directed to a system for automatically editing product video footage. The system includes at least one memory for storing computer-executable instructions and at least one processor for executing the instructions stored on the at least one memory. Execution of the instructions programs the at least one processor to perform operations that include receiving product video footage associated with a product, generating a feature list including a plurality of features of the product, assigning different portions of the product video footage to each feature of the plurality of features, creating a plurality of product artifacts from the portions of the product video footage assigned to each of the plurality of features, receiving a deliverable requirement list defining requirements for at least one media deliverable, and generating the at least one media deliverable using the plurality of product artifacts based on the deliverable requirement list.

In some embodiments, generating the feature list includes receiving product metadata data corresponding to the plurality of product features and generating the feature list based on the product metadata. In some embodiments, generating the feature list includes analyzing the product video footage to derive product metadata corresponding to the plurality of product features and generating the feature list based on the product metadata. In some embodiments, assigning different portions of the product video footage to each feature of the plurality of features includes assigning at least one timecode of the raw product video footage to each feature of the plurality of features.

In some embodiments, assigning different portions of the product video footage to each feature of the plurality of features includes assigning at least one video coordinate of the product video footage to each feature of the plurality of features. In some embodiments, the at least one video coordinate indicates a region of the product video footage where the corresponding feature is displayed. In some embodiments, execution of the instructions programs the at least one processor to perform operations that include assigning dimensions of a box to the at least one video coordinate. In some embodiments, the box encompasses a region of the product video footage where the corresponding feature is displayed.

In some embodiments, generating the at least one media deliverable using the plurality of product artifacts based on the deliverable requirement list includes integrating at least one infographic with at least one product artifact. In some embodiments, generating the at least one media deliverable using the plurality of product artifacts based on the deliverable requirement list includes integrating at least one interactive element with at least one product artifact. In some embodiments, the at least one media deliverable includes at least one image. In some embodiments, the at least one media deliverable includes at least one video. In some embodiments, the at least one media deliverable includes at least one interactive video. In some embodiments, the at least one media deliverable includes two or more artifacts from the plurality of artifacts arranged in a sequence.

Further aspects and advantages of the invention will become apparent from the following drawings, detailed description, and claims, all of which illustrate the principles of the invention, by way of example only.

BRIEF DESCRIPTION OF THE DRAWINGS

A more complete appreciation of the invention and many attendant advantages thereof will be readily obtained as the same becomes better understood by reference to the following detailed description when considered in connection with the accompanying drawings. In the drawings, like reference characters generally refer to the same parts throughout the different views. Further, the drawings are not necessarily to scale, with emphasis instead generally being placed upon illustrating the principles of the invention.

FIGS. 3A-3C illustrate examples of product metadata in accordance with aspects described herein;

FIG. 5 illustrates example product representation metadata in accordance with aspects described herein;

DETAILED DESCRIPTION

Figure 1:
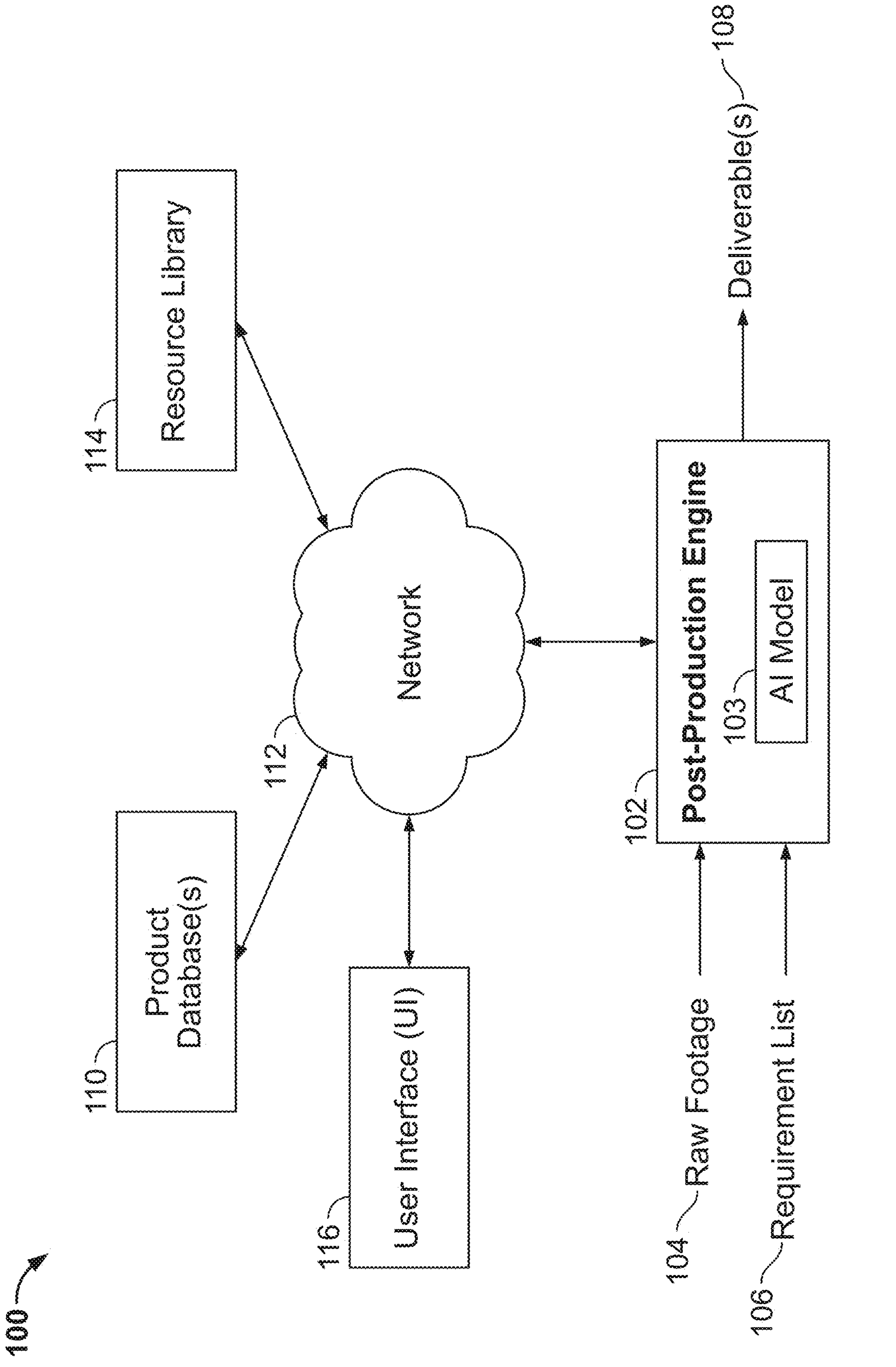
FIG. 1 illustrates a block diagram of a video editing system in accordance with aspects described herein.

Disclosed herein are exemplary embodiments of systems and methods for editing product videos in post-production. In particular, described are various embodiments of a system configured to provide automatic post-production editing.

As discussed above, product videos are often used to showcase a particular product, highlighting its features, benefits, and use cases. These videos can be used for marketing purposes to promote and sell the product to potential customers. Product videos can take various forms, including live-action videos, animated videos, 3D renderings, and demonstrations. They can be created by companies, marketers, and/or individuals, and are often shared on social media, websites, and other online platforms to generate buzz and increase sales. The goal of a product video is to provide viewers with a clear understanding of what the product is, how it works, and why they should buy it.

Product videos can be filmed in a variety of ways, depending on the type of product, the desired outcome, and the budget. In many cases, product videos are filmed using a production plan that describes a list of shots that are desired for the video. Such production plans can include specific types of equipment and/or tools for capturing and editing the shots. In some examples, the filming of a product video includes several stages. For example, a pre-production stage includes developing a script, storyboard, or shot list (e.g., to be included in the production plan). The pre-production stage may also include selecting the right equipment, such as cameras, lighting, and sound equipment. During a set-up stage, the filming location is prepared with props, lighting, and any necessary equipment. The product may be set-up and positioned in a way that is visually appealing. Next, during a filming stage, the product is captured from different angles and distances (e.g., in accordance with the production plan). Depending on the type of product, close-ups of specific features or components may be included. In a post-production stage, the footage is edited to create the final product video. This may include adding music, voiceover, text overlays, and special effects. In some examples, color correction and audio editing may be performed. In a finalization stage, the product video is exported and/or compressed to an appropriate file format and resolution for a desired platform or medium.

The filming of a product video involves careful planning, attention to detail, and technical expertise. In some cases, the production plan that includes all of the shots needed to create the product video is created manually (e.g., by directors or producers of the product video). In other cases, the production plan for the product video may be generated automatically. Likewise, the product video footage may be recorded (or filmed) automatically based on the production plan. Examples of automatically generated production plans and automatically recorded product videos can be found in U.S. patent application Publication Ser. No. 18/331,494, filed Jun. 8, 2023 and titled "AUTOMATED PRODUCTION PLAN FOR PRODUCT VIDEOS," which is hereby incorporated by reference in its entirety.

The editing of a product video (e.g., in the post-production stage) often includes specialized edits made by one or more video editors. As such, the editing of such product videos can be a lengthy, manual process. For example, the different editors and/or teams may provide unique contributions to the video editing process. Furthermore, discrepancies may arise between the product seller (or advertiser) and the editors when developing for product videos.

Accordingly, improved systems and methods for automatically editing product videos are provided herein. In at least one embodiment, raw product video footage associated with a product is used to generate a feature list including a plurality of features of the product. In some examples, different portions of the raw product video footage are assigned to each feature of the plurality of features and a plurality of product video artifacts are created from the assigned portions of the raw product video footage. In some examples, a deliverable requirement list defining requirements for at least one deliverable product video is used to generate a deliverable product video (or videos) using the plurality of video artifacts.

FIG. 1 is a block diagram of a video editing system 100 in accordance with aspects described herein. In one example, the system 100 includes a post-production engine 102. The post-production engine 102 is configured to receive raw video footage 104. The raw video footage 104 may correspond to a raw (or unedited) product video associated with a product. In some examples, the raw video footage 104 includes 360 degree videos of the product, close-ups of a product representation (e.g., a feature, an element, an accessory, an action, or important visual information), and zoom-ins on the product (or product accessories). It should be appreciated that the raw video footage 104 may include footage of the product while the product is stationary, footage of the product while the product is moving, footage of the product operating, and/or footage of the product being used in operation. In addition, the raw video footage 104 may include footage of the product packaging. In some examples, the raw video footage 104 may correspond to multiple products (e.g., variations of the same product, a product with an accessory, compatible products, different products, etc.).

In some examples, the raw video footage 104 corresponds to video footage collected manually by a production team (e.g., via one or more cameras in a studio). In some examples, the raw video footage 104 corresponds to video footage collected automatically in an automated studio or facility. The use of an automated studio or facility may be beneficial in streamlining the post-production editing of the raw video footage 104. For example, using the same or similar shots (e.g., same lenses, camera movement, lights, background, etc.) for similar products may allow for streamlined post-production editing across different products. In some examples, the use of an automated studio enables the raw footage for similar products to be compared and/or combined (e.g., using seamless transitions). In some examples, the raw product footage 104 includes product metadata that is processed by the post-production engine 102 (described in greater detail below).

In addition to the raw video footage 104, the post-production engine 102 is configured to receive a requirement list 106 that defines (or incudes) requirements for one or more deliverables 108. In some examples, the requirement list 106 is provided or created by an end user of the deliverables 108. For example, the end user may be a seller, distributor, manufacturer, or advertiser of the product(s) associated with the raw video footage 104. In some examples, the post-production engine 102 is configured to use the requirement list 106 as a guideline (or reference) when editing the raw video footage 104 to produce the deliverables 108. The deliverables 108 may include videos and/or pictures. In some examples, the deliverables 108 are configured to be included in an interactive presentation (e.g., an interactive video or module). The deliverables 108 may be generated for marketing purposes, web pages, product detail pages (PDPs), printing, interactive videos, and any other form of audio-visual presentation.

In some examples, the post-production engine 102 is configured to communicate with one or more product databases 110 over a network 112 (e.g., a wired or wireless internet connection). In some examples, the post-production engine 102 receives (or retrieves) product data from the product database 110. The product data may correspond to the product(s) associated with the raw video footage 104. In some examples, the product database 110 may include data associated with products similar to (or related to) the product. For example, the product database 110 may include data previously collected from the same product. The product database 110 may include data previously collected from a different variation of the same product (e.g., a different color, size, etc.). In some examples, the product database 110 includes data associated with products made by the same manufacturer (e.g., the same brand). Likewise, the product database 110 may include data associated with similar products made by different manufacturers (e.g., different brands).

The post-production engine 102 is also configured to communicate with a resource library 114 (e.g., via network 112). In some examples, the resource library 114 includes graphical elements that may be incorporated with the raw video footage 104 to produce the deliverables 108. For example, such graphical elements may include logos, labels, signs, arrows, animations, infographics, and any other suitable type of graphic. It should be appreciated that the resource library 114 can include image-based and/or video-based graphics. In addition, the resource library 114 may include interactive elements that may be incorporated with the raw video footage 104 to produce the deliverables 108. For example, such interactive elements may include buttons, sliders, prompts, window boxes, drop down menus, and any other suitable type of interactive element.

As described in greater detail herein, the post-production plan engine 102 may utilize an artificial intelligence (AI) model 103 to generate (or assist with generating) the deliverables 108. In some examples, the AI model 103 is a generative pretrained transformer (GPT) model. In some examples, the AI model 103 may include other model types, such as, for example: a gradient boosted random forest, a regression, a neural network, a decision tree, a support vector machine, a Bayesian network, or other suitable types of techniques. In some examples, the AI model 103 is specifically trained for the purposes of video post-production.

Figure 2:
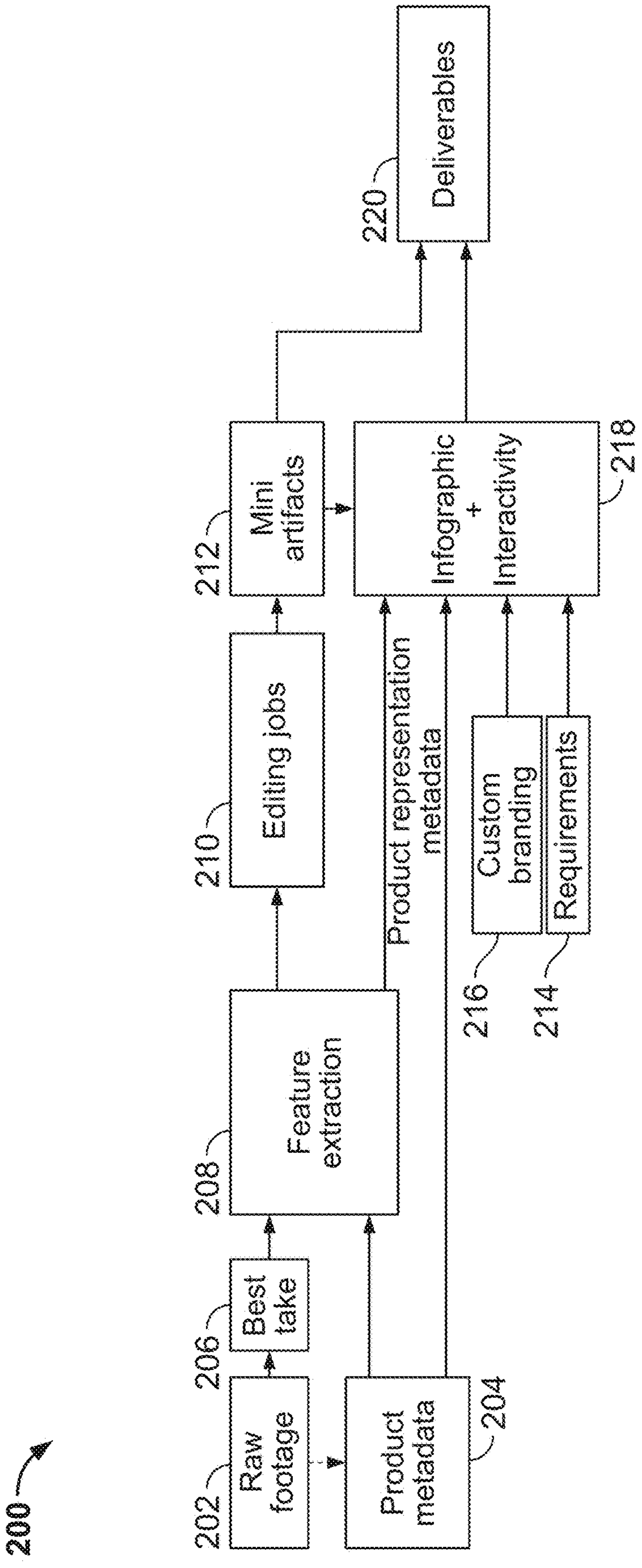
FIG. 2 illustrates a flow diagram of a method for generating one or more product deliverables in accordance with aspects described herein.

FIG. 2 is a flow diagram of a method 200 for generating one or more product deliverables in accordance with aspects described herein. In one example, the method 200 is configured to be carried out by the video editing system 100 of FIG. 1.

At block 202, the raw video footage 104 associated with a product is received by the post-production engine 102. As described above, the raw video footage 104 may be provided manually (e.g., from a production team) or automatically (e.g., from an automated studio).

At block 204, product metadata for the product is obtained by the post-production engine 102. In some examples, the product metadata is received by the post-production engine 102 with the raw video footage 104. For example, the automated studio may construct and provide product metadata with the raw video footage 104. The product metadata includes information about representations of the product. Each product representation is a part of the product that has its own metadata and can be represented by audio/video assets. A product representation can be a feature, an element, an accessory, an action, or any important information about the product that can be presented visually. Examples of product representations of a stroller are: brakes, one hand folding, car seat, anti-vibrations, lightweight, and storage basket. Likewise, examples of product representations of a coffee maker are: water container, milk frother, espresso functionality, cappuccino functionality, cleaning, and type of capsules. Similarly, examples of product representations of a cookies box are: closed box, opened box, cookies types, a broken cookie, and list of ingredients.

In addition, the product metadata includes information about each shot in the raw video footage 104. For example, for each shot in the raw video footage 104, the product metadata may include: a shot ID, a product representation name, a product representation description, production notes (e.g., camera movement, type of shots, etc.), graphics to add (e.g., sizes, movement directions, etc.), text to add (e.g., features, modes, ingredients, safety, etc.), original audio included in the shot (e.g., toy squeaking, coffee maker operating, etc.), audio to add (e.g., music, narration, etc.), automated order given in production (e.g., to an automated robot, camera, etc.), or any combination thereof. In some examples, the post-production engine 102 is configured to generate a product feature list based on the received product metadata. The product feature list may include all features of the product. In some examples, the feature list includes physical features of the product, modes of the product, movements of the products, and actions or examples of the product in operation.

In cases where the product metadata is not provided with the raw video footage 104, the post-production engine 102 is configured to process and analyze the raw video footage 104 to extract the corresponding product metadata. In some examples, the post-production engine 102 is configured to retrieve product data from the product databases 110. For example, the retrieved product data may include digital product data (e.g., information from a PDP) and/or physical product data (e.g., images or scans of the product or product packaging). In some examples, the post-production engine 102 uses the product data as a guide (or reference) when analyzing the raw video footage 104. In some examples, the AI model 103 is used to assist in the extraction of the product metadata. For example, the AI model 103 may be trained to identify product representations in the raw video footage 104. In some examples, the retrieved product data from the product databases 110 is provided as an input to the AI model 103 along with the raw video footage 104. For each shot of the raw video footage 104, the post-production engine 102 may assign a shot ID, a product representation name, and a product representation description. In some examples, the product presentation description is generated via the AI model 103 based on the product representation name and/or the shot footage. In some examples, the post-production engine 102 is configured to generate a product feature list based on the generated product metadata and/or the product data retrieved from the product databases 110.

FIGS. 3A-3C illustrate examples of product metadata in accordance with aspects described herein. As shown, the product metadata may be represented in data tables. Each data table may include a first column including an ID (e.g., a feature ID, a shot ID, etc.), a second column including a feature name, a third column including a description (e.g., a feature description, a shot description, etc.), and/or columns including other desired data. It should be appreciated that the product metadata may be represented in different formats.

At block 206, the post-production engine 102 selects the best take from the raw video footage 104. For example, during production, several takes of the same area or feature of the product may be shot. In some examples, the post-production engine 102 analyzes these shots and selects the best take based on various video metrics (e.g., focus, smoothness, length, brightness, contrast, jitter, etc.). In some examples, the post-production engine 102 is configured to receive preferences from the end user and/or the production team that determine which video metrics to prioritize (e.g., via a user interface (UI) 116). In some examples, the post-production engine 102 is trained to weigh the various video metrics based on best production practice. If the raw video footage 104 is long, the post-production engine 102 may also cut the footage into smaller pieces and then analyze the quality of each piece. In such examples, the post-production engine 102 may select the takes (or pieces) with the best quality. It should be appreciated that the raw video footage 104 may include only one take, rendering this step optional or skippable. In some examples, the post-production engine 102 presents a plurality of video options to the end user and/or the production team. In such examples, the best take may be selected by the end user and/or the production team.

Figure 4A:
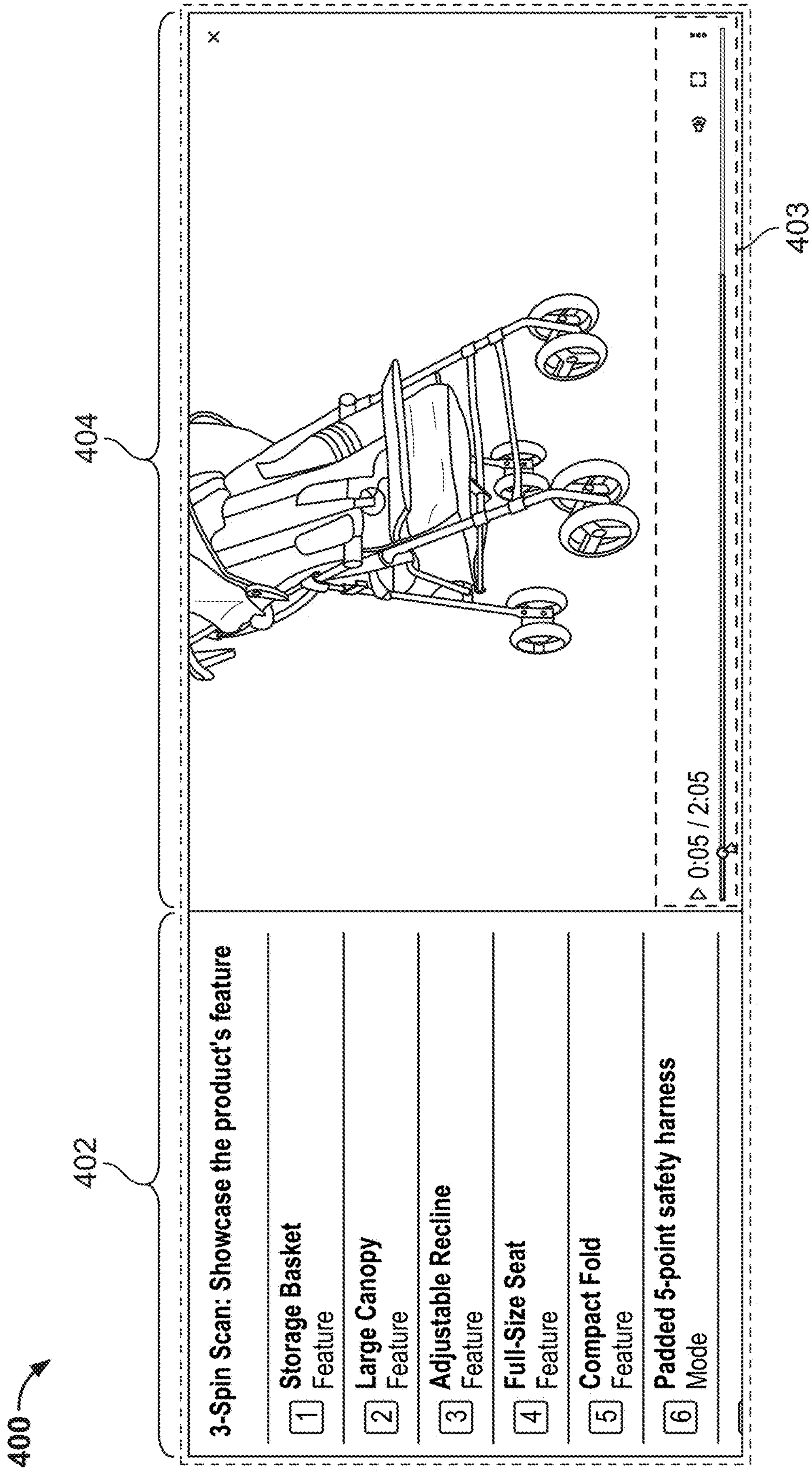
FIGS. 4A-4B illustrate a user interface for assigning product features to portions of product video footage in accordance with aspects described herein.

At block 208, the post-production engine 102 enables different portions of the raw video footage 104 to be assigned to features of the product. In some examples, each shot of the raw video footage is assigned to the features in the feature list generated from the product metadata. In some examples, the assignment (or mapping) of shots to features is based on input from a user (e.g., a production team member or the end user of the deliverables 108). For example, as shown in FIG. 4A, a UI 400 is provided that includes a feature list 402 alongside the raw video footage 104 (or the selected best take of the raw video footage 104). In some examples, the UI 400 corresponds to the UI 116 of FIG. 1. The feature list 402 includes the known (or expected) product representations included in the raw video footage 104. As described above, the feature list 402 may include physical features of the product, modes of the product, movements of the products, and actions or examples of the product in operation. The user may interact with the UI 400 to connect the features in the feature list 402 to portions (or sections) of the raw video footage 104. In some examples, the user connects features to the raw video footage 104 by selecting timecode(s), an X/Y box in the video frame, and a zoom level for each feature. The UI 400 may include a control panel 403 that allows the user to play, pause, and/or skip through the raw video footage 104 to find the features in the feature list 402.

Figure 4B:
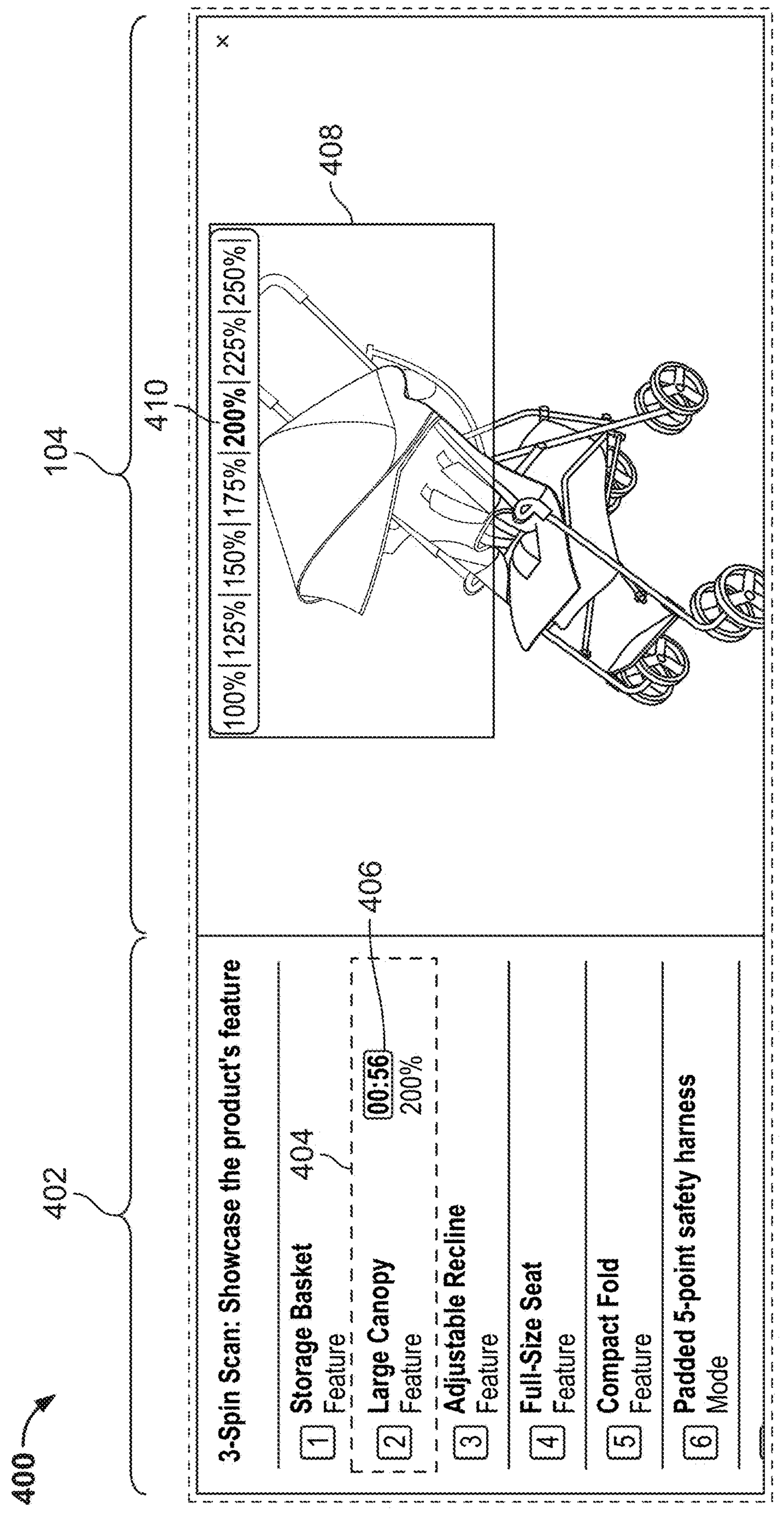

FIG. 4B illustrates an example of connecting a feature 404 to a portion of the raw video footage 404. First, the user may select a timecode 406 for the feature 404. In some examples, the timecode 406 is automatically selected in response to the user selecting the feature 404 during the playthrough of the raw video footage 104. In some examples, the time code 406 includes a start time and an end time that defines the portion of the raw video footage 104 that corresponds to the feature 404. In some examples, the end time is automatically selected in response to the user unselecting the feature 404 or in response to the user selecting a different feature. Second, the user may position and/or size an X/Y box 408 over the feature 404 in the raw video footage 404. The X/Y box 408 may alternatively be referred to as a bounding box. The user may position and/or size the X/Y box 408 to encompass the feature 404. Third, the user may select a zoom level 410 that is appropriate for the feature 404. For example, a higher zoom level may be selected for small physical features relative to a zoom level for large physical features. In some examples, the zoom level 410 is selected from a plurality of predetermined zoom levels. In other examples, the zoom level 410 may be a custom zoom level. The user may repeat this process to connect a desired number of features in the feature list 402. In some examples, the user may connect the entire feature list 402; however, in other examples, the user may connect only a portion of the feature list 402. The UI 400 may provide feedback to guide the user during the connection process. For example, a feature may be highlighted green in the feature list 402 once it has been connected to a portion of the raw video footage 104.

In some examples, the post-production engine 102 is configured to derive product representation metadata from the connections made by the user. FIG. 5 illustrates an example of product representation metadata 500 derived by the post-production engine 102 for multiple product features. The first column 502 includes the name of the features (e.g., the name of feature 404). The second column 504 includes a product mode corresponding to each feature. The third column 506 includes an ID and description of the shot corresponding to each feature. The fourth column 508 includes the start time (or in-time) of the portion of the raw video footage 104 connected to each feature (e.g., the start time of timecode 406). The fifth column 510 includes the end time (or out-time) of the portion of the raw video footage 104 connected to each feature (e.g., the end time of timecode 406). When a feature is being connected to an image (e.g., a single frame), the fifth column may be left blank, filled with the same time as the fourth column, or filled with a predetermined text label (e.g., "Picture"). The sixth column 512 includes the selected zoom level for each feature (e.g., the zoom level 410). The seventh column 514 includes the X/Y coordinates for the upper left corner of the X/Y box 408 for each feature. In some examples, the seventh column 514 includes X/Y coordinates that references a different location (e.g., the center of action). In some examples, the X/Y coordinates are in pixel units; however, in other examples, the X/Y coordinates may use different units (e.g., millimeters, arbitrary units, etc.). The eighth column 516 includes the X/Y dimensions (e.g., X by Y, or X×Y) of the X/Y box 408 for each feature. The X/Y dimensions may use the same units as the X/Y coordinates in the seventh column 514. It should be appreciated that number of product representation metadata columns and the types of product representation metadata included in each column may vary based on the product type and/or the configuration of the post-production engine 102.

In some examples, the assignment (or mapping) of shots to features is performed automatically (e.g., via the AI model 103). In other words, the product representation metadata 500 of FIG. 5 may be derived automatically from the raw video footage 104 without input from the user. For example, the AI model 103 may analyze the raw video footage 104 to determine which portions correspond to the features in the feature list 402. In some examples, the AI model 103 may utilize notes, file names, shot names, and audio voiceovers from the raw video footage 104 to map the various features to different portions of the footage 104. For example, during the recording of the raw video footage 104, the production team may insert text or audio that helps identify the feature included in each shot (or groups of shots). In some examples, based on the movement in a frame, the post-production engine 102 (or the AI model 103) may detect when the camera is moving and apply automatic motion presets and cuts, while following the product representation's location in the video.

Figure 6:
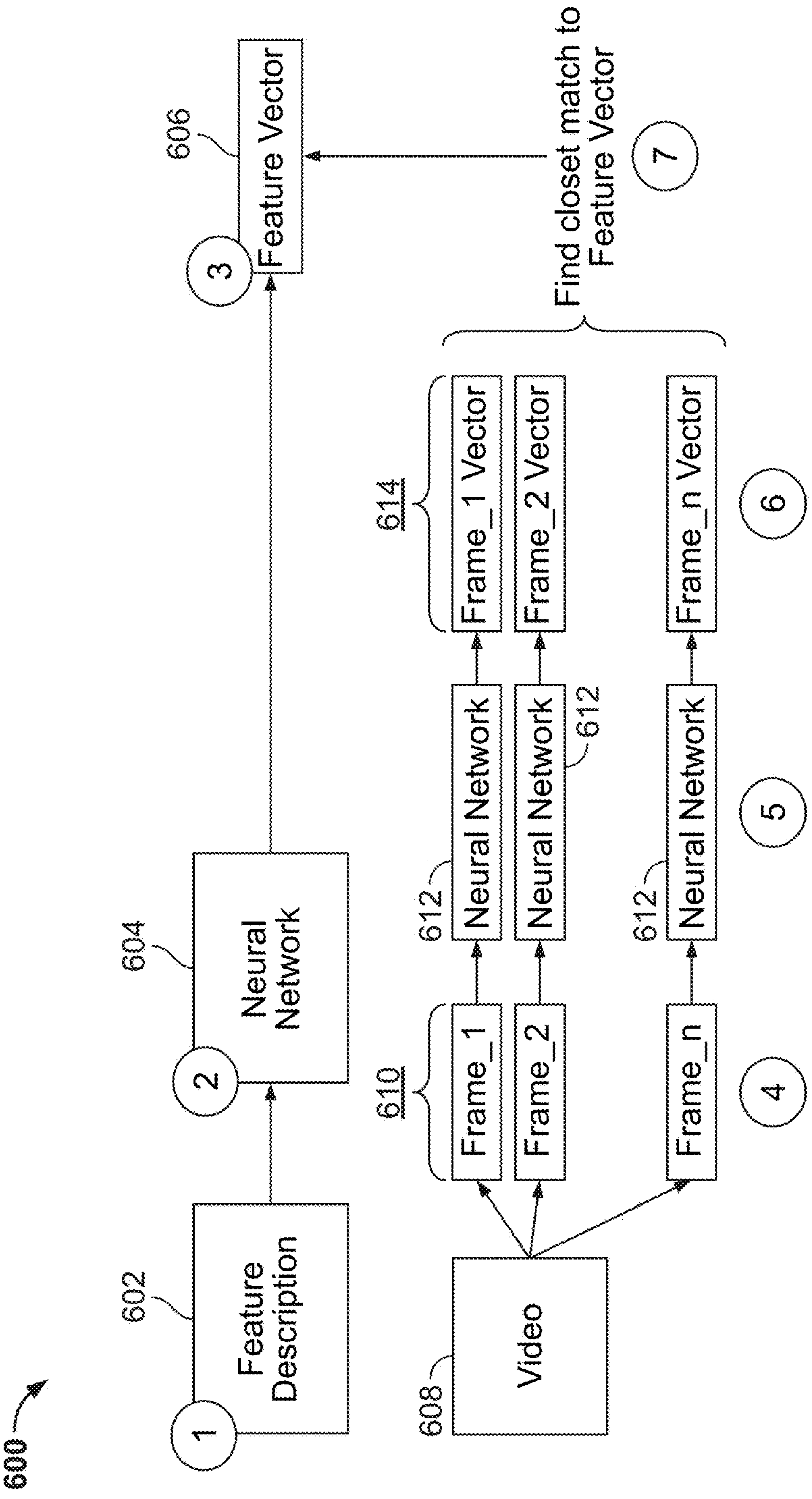
FIG. 6 illustrates a process for automatically assigning product features to portions of product video footage in accordance with aspects described herein.

FIG. 6 illustrates an automatic process 600 for assigning features to portions of raw video footage. In some examples, the process 600 is configured to be carried out, at least in part, by the AI model 103 of the post-production plan engine 102. In some examples, the process 600 is performed at block 208 of the method 200.

At step 1, a feature description 602 is provided for tagging a particular product feature in raw video footage 608. In some examples, the feature description 602 corresponds to a portion of the product metadata obtained (or received) in block 204. The feature description 602 may include information representing properties or characteristics of the associated product feature.

At step 2, the feature description 602 is provided to a trained neural network 604. The neural network 604 may be included in the AI model 103. In some examples, the neural network 604 is an external network in communication with the AI model 103 and/or other components of the post-production engine 102. In some examples, the neural network 604 is iteratively trained using historical product video datasets. For example, the neural network 604 may be trained using existing product video footage and corresponding information relating to the features included in the video footage (e.g., the locations of each feature). As such, the neural network 604 may be trained to automatically extract feature information from raw video footage.

At step 3, the trained neural network 604 is configured to output a feature vector 606 based on the feature description 602. In some examples, the feature vector 606 includes a plurality of numbers (e.g., rational numbers between −1 to 1) that represent one or more words associated with the feature description 602. For example, different vectors may be chosen for a library of different words. In some examples, each vector captures the semantic and syntactic qualities of the corresponding word(s). In some examples, the neural network 604 utilizes a natural language processing technique (e.g., Word2vec) to select (or generate) the feature vector 606.

At step 4, the raw video footage 608 is split into a plurality of frames 610. In some examples, the plurality of frames 610 includes a portion of the total frames in the raw video footage 608. For example, the plurality of frames 610 may include frames that appear at an interval (e.g., every 1 sec, every 2 secs, etc.).

At step 5, each frame of the plurality of frames 610 is provided to a trained neural network 612. In some examples, the neural network 612 may be the same as neural network 604; however, in other examples, the neural network 612 may be a different neural network (e.g., included in AI model 103 or an external network).

At step 6, the neural network 612 is configured to output a plurality of frame vectors 614 based on the plurality of frames 610 (e.g., one vector per frame). In some examples, each frame vector includes a plurality of numbers that represent one or more words associated with the frame (e.g., what is represented by the frame, what is featured in the frame, etc.). In some examples, the neural network 612 utilizes a natural language processing technique (e.g., Word2vec) to select (or generate) the frame vectors 614.

At step 7, the AI model 103 (or the post-production engine 102) compares each vector of the plurality of frame vectors 614 to the feature vector 606. The frame vector that is the closest match to the feature vector 606 is selected for the product feature associated with the feature description 602. In some examples, the "closest match" provides an indication of the frame having the best image of the product feature. In some examples, the AI model 103 is configured to locate the area within the selected frame that shows the center of action of the feature. In some examples, the AI model 103 is configured to select frames that are adjacent to the selected frame (e.g., ±3 secs, ±3 frames, etc.) to extract a video clip of the product feature from the raw video footage 608. It should be appreciated that instead of physically extracting video frames associated with the product feature, the AI model 103 may record the start and/or stop times associated with the identified video frames (e.g., similar to columns 508, 510 of product representation metadata 500 of FIG. 5).

Figure 7:
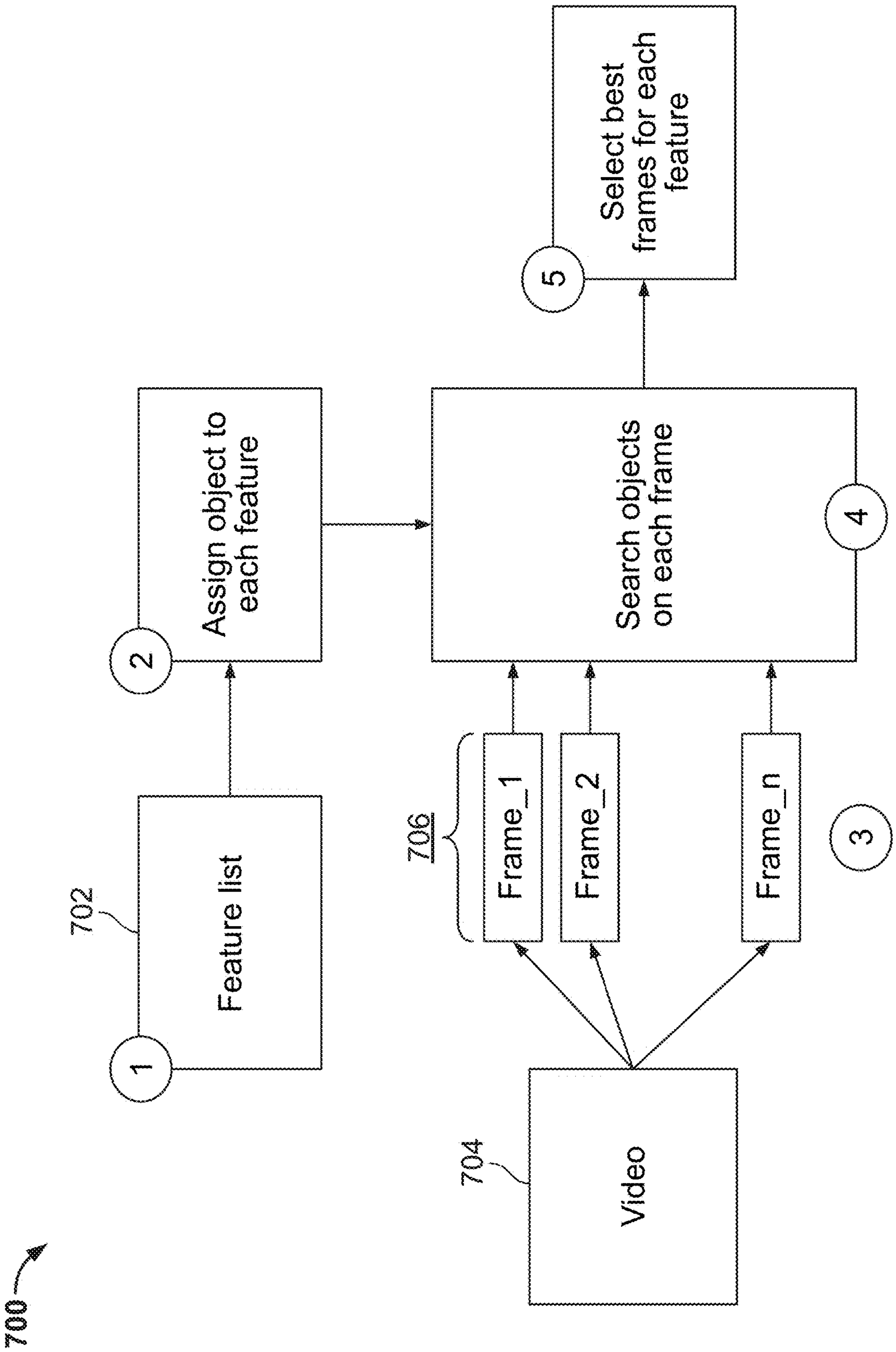
FIG. 7 illustrates a process for automatically assigning product features to portions of product video footage in accordance with aspects described herein.

FIG. 7 illustrates another automatic process 700 for assigning features to portions of raw video footage. In some examples, the process 700 is configured to be carried out, at least in part, by the AI model 103 of the post-production plan engine 102. In some examples, the process 700 is performed at block 208 of the method 200. In some examples, the process 700 may be performed instead of, or in addition to, the process 600 of FIG. 6.

At step 1, a feature list 702 is provided for tagging specific product features in raw video footage 704. In some examples, the feature list 702 corresponds to a portion of the product metadata obtained (or received) in block 204. As described above, the product metadata may be used to generate the feature list 702. The feature list 702 may include information representing properties or characteristics of the associated product feature.

At step 2, each feature included in the feature list 702 is assigned to at least one object or action in the raw video footage 704. In some examples, the assignable objects/actions correspond to objects/actions that are known to be or expected to be included in the raw video footage 704. Each feature may be assigned to an object or action that represents or otherwise demonstrates the corresponding feature. For example, a "smooth driving" feature may be assigned to the wheels of a stroller, a "storage space" feature may be assigned to a basket of the stroller, and a "lightweight" feature may be assigned to the entire stroller, and a "one-hand folding" feature may be assigned to a folder version of the stroller. In some examples, the assignment of features to objects/actions is performed by the AI model 103. In some examples, the assignment of features to objects/actions is performed by a user (e.g., via the UI 116).

At step 3, the raw video footage 704 may be split into a plurality of frames 706. In some examples, the plurality of frames 706 includes a portion of the total frames in the raw video footage 704. For example, the plurality of frames 706 may include frames that appear at an interval (e.g., every 1 sec, every 2 secs, etc.).

At step 4, the plurality of frames 706 are searched to identify the objects/actions included in each frame. In some examples, the search is performed by the AI model 103. In some examples, the search is performed using an image search function (e.g., a program or function that performs an search using an image as the search query). The image search function may be an internal function (e.g., internal to the AI model 103 or the post-production engine 102) or an external function (e.g., that the AI model 103 or post-production engine 102 communicates with over network 112). In some examples, the results of the search are used to tag or label different objects/actions included in each frame. In some examples, the type of object/action and the location within the frame is recorded frame object/action.

At step 5, the AI model 103 (or the post-production engine 102) selects the best frame(s) for each feature in the feature list 702. In some examples, the "best" frame corresponds to the frame that provides the best image of the objects/actions assigned to the feature. For example, the frame(s) selected for a particular feature may correspond to the frame(s) where the object/actions assigned to the feature are largest and/or closest to the center of the frame. In some examples, the AI model 103 is configured to select frames that are adjacent to the selected frame(s) (e.g., ±3 secs, ±3 frames, etc.) to extract a video clip of the product feature from the raw video footage 704. It should be appreciated that instead of physically extracting video frames associated with the product features, the AI model 103 may record the start and/or stop times associated with the identified video frames (e.g., similar to columns 508, 510 of product representation metadata 500 of FIG. 5).

It should be appreciated that the end user and/or the production team may review the feature assignments. In some examples, new features may be added and assigned manually by the end user and/or the production team.

Returning to FIG. 2, at block 210, the post-production engine 102 performs one or more editing jobs on the raw video footage 104. In some examples, the post-production engine 102 is configured to receive preferences from the end user and/or the production team that determine which editing jobs to perform (e.g., via UI 116). In some examples, the post-production engine 102 is trained to perform specific editing jobs from a list of editing jobs based on best production practice. In some examples, the types of editing jobs performed correspond to the type of product that is featured in the raw video footage 104. For example, the same editing jobs may be performed for the same or similar products.

One editing job that may be performed is a clean footage job. The clean footage job finds unique parts in the raw video footage 104 that should be removed (e.g., unneeded text, logo, hands, etc.). In some examples, the user may provide a list of things to remove or keep. In such examples, the post-production engine 102 identifies those areas of the footage and cleans them automatically. Another editing job that may be performed is dynamic color correction. Based on the brightness of the filmed product, the post-production engine 102 dynamically applies color correction to get good looking, healthy-contrasted visuals. This also ensures color consistency across all product videos. Another editing job that may be performed is a trimming job. Based on the in/out values (e.g., columns 508 and 510 of product representation metadata 500 in FIG. 5), the raw video footage 104 is automatically trimmed. In one example, the raw video footage 104 is cut at the exact in/out times. In some examples, the raw video footage is cut near the in/out times in a manner that provides a clean transition in or out of each trimmed video section. For example, the cut locations may be determined based on a combination of the in/out times and an audio analysis of "action/cut" that is added during production, or by any other way that marks an in/out transition on the production set. Another editing job that may be performed is cropping. The raw video footage 104 may be cropped (e.g., width and/or height) based on the center-of-action. The center-of-action may be defined by the production team or automatically. In some examples, the center-of-action corresponds to the center of the X/Y box for each feature (e.g., the X/Y box 408).

Figure 8:
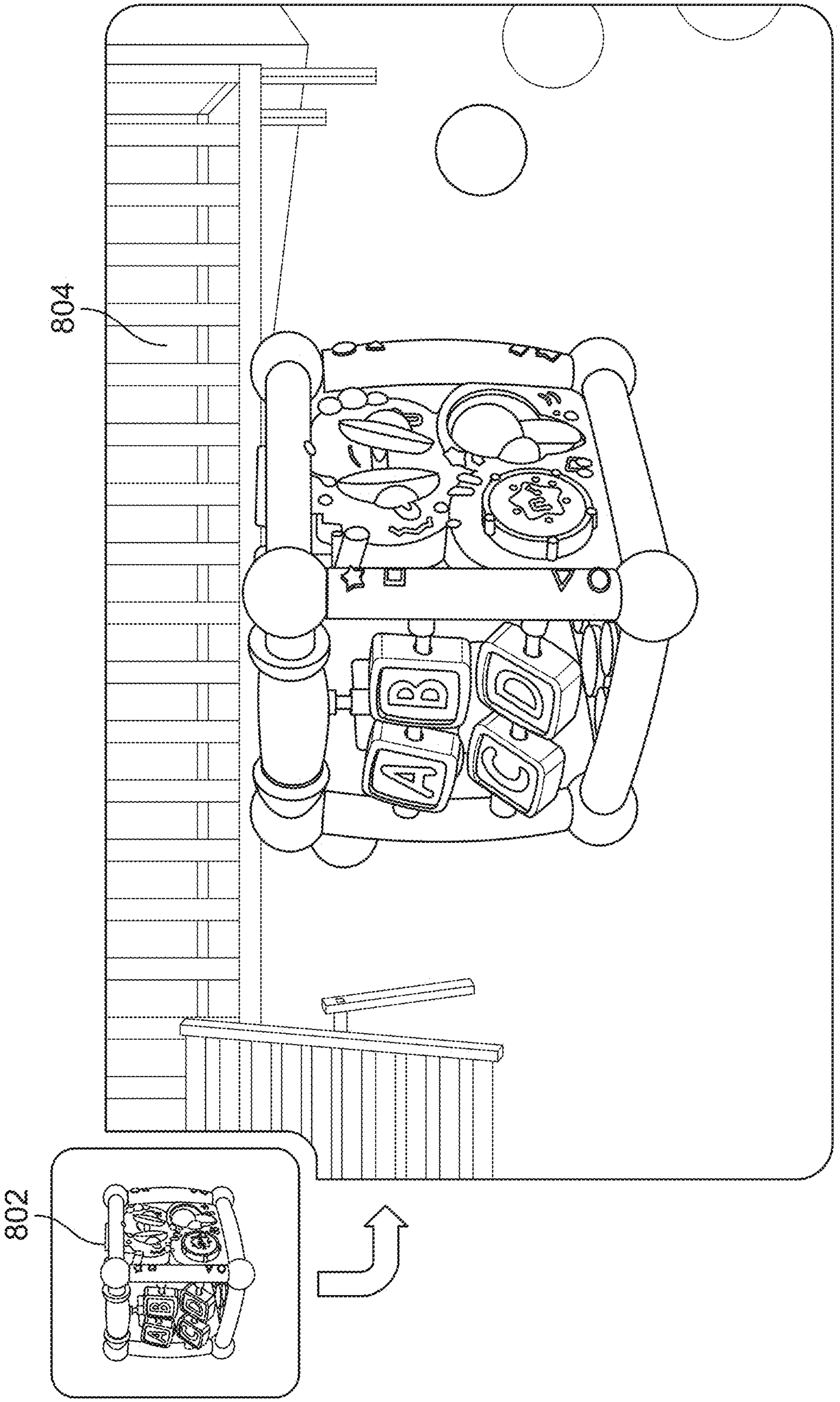
FIG. 8 illustrates an example product background in accordance with aspects described herein.

In some examples, the post-production engine 102 may perform a general video correction job. The general video correction job may automatically manage the size, speed, rotation, trims, and in/out times of all videos to ensure all videos have the same feel or appearance. Another editing job that may be performed is a change background job. The background in the raw video footage 104 (e.g., the production studio) may be automatically removed. In some examples, a desired background for the product is automatically added (e.g., a background supplied by the production team or the end user of the deliverables 108). For example, as shown in FIG. 8, the original background behind product 802 has been removed and a desired background 804 is added. In some examples, the post-production engine 102 is configured to create a three-dimensional (3D) model of the product from the raw video footage 104. For example, if the raw video footage 104 includes a 360 degree view of the product, the post-production engine 102 may build a 3D model of the product. The 3D model may provide depth information for every point in the video. Such depth information may be used by the post-production engine 102 to position items (e.g., infographics) behind and through the product when generating the deliverables 108. In addition, the post-production engine 102 may be configured to edit the sound of the raw video footage 104. In some examples, the post-production engine automatically mixes the existing sounds from the raw video footage 104 with music and/or narration if needed. In some examples, the post-production engine 102 creates separate music tracks that are used or referenced when creating the final deliverables 108.

In some examples, the post-production engine 102 is configured to provide samples to the end user and/or the production team before performing one or more of the editing jobs described above. For example, the post-production engine 102 may present a plurality of sample clips (or images) that represent different settings for an editing job (e.g., color correction). In such examples, the end user and/or production team may select the sample (or samples) that represent preferred settings. The post-production engine 102 may then perform the editing job using the preferred setting selected by the end user and/or the production team.

At block 212, the post-production engine 102 creates one or more artifacts from the portions of the raw video footage 104 (or the edited version(s) of the footage 104) assigned to the product features. Each artifact (or mini-artifact) is a fully edited building block that may be used to create the final deliverables 108. The artifacts may be still images, clean videos, videos with infographics, 360 degree videos, or any other suitable media building block. In some examples, the post-production engine 102 is configured to automatically create the artifacts using the produce representation metadata derived in block 208. The artifacts may be arranged and stored based on the product representations that they represent (e.g., in a database, folder structure, etc.). In some examples, the artifacts are stored with the product representation metadata that was used to create them. Such metadata may be made visible to users (e.g., via UI 116) to review the accuracy of the post-production engine 102. In some examples, the post-production engine 102 is configured to assign an ID to each artifact such that one or more of the artifacts can be retrieved for use in the final deliverables. In some examples, the post-production engine 102 is configured to present the artifacts to the end user and/or the production team. In such examples, the end user and/or the production team may provide feedback that is used by the post-production engine 102 to revise, alter, or modify the artifacts.

At block 214, the post-production engine 102 receives the requirement list 106. As described above, the requirement list 106 defines (or incudes) requirements for the deliverables 108. The requirement list 106 may include the quantity and/or the types of deliverables to create (e.g., images, videos, etc.). In some examples, the requirement list 106 may list specific features of the product to create deliverables for. The requirement list 106 may include rules for the deliverables 108. For example, such rules may include: a maximum video time, a minimum video time, a minimum number of features includes in a single deliverable, a maximum number of features includes in a single deliverable, types of features that should be included in the same deliverables, types of features that should be included in separate deliverables, etc. In some examples, the requirement list 106 includes a list of deliverables to be created. The list of deliverables may include an assignment of one or more product features to each deliverable. In some examples, the assignment of product features to deliverables may be performed automatically by the post-production engine 102. For example, the requirement list may include a deliverable that calls for three different features and the post-production engine 102 (or AI model 103) may assign three features having artifacts compatible with the deliverable type. In some examples, the post-production engine 102 may consider other factors (e.g., the rules described above) when assigning features (or artifacts) to each deliverable included in the requirement list 106.

Figure 9:
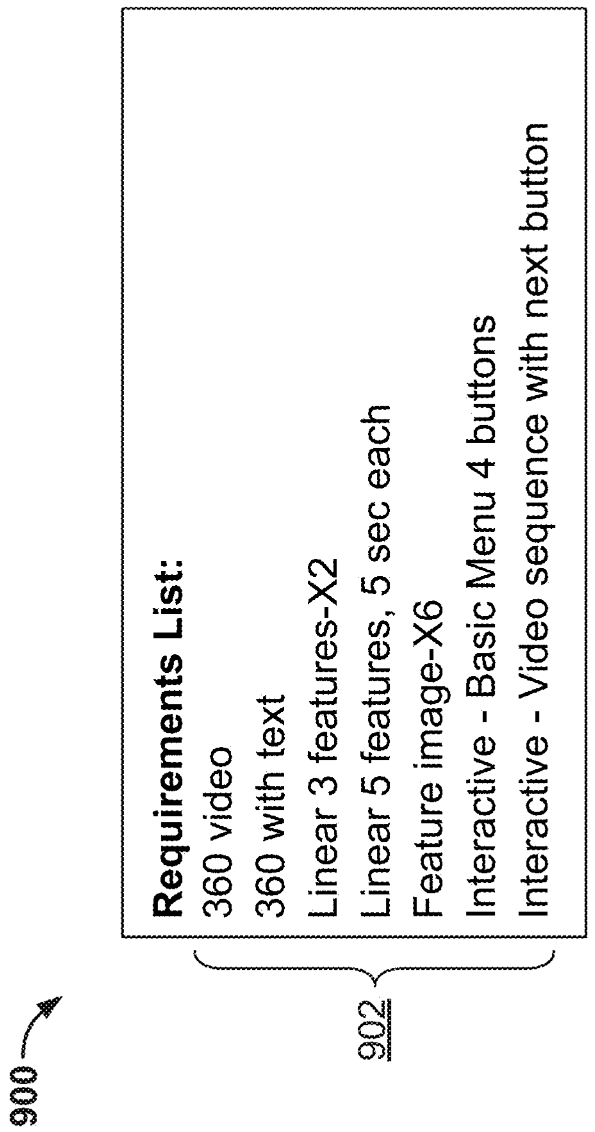
FIG. 9 illustrates an example requirement list in accordance with aspects described herein.

FIG. 9 illustrates an example requirement list 900 in accordance with aspects described herein. As shown, the requirement list 900 includes a plurality of deliverables 902. While the illustrated example includes seven deliverables, the requirement list 900 may include any desired number of deliverables (e.g., 1, 9, 100, etc.). In some examples, the plurality of deliverables 902 includes a description of each deliverable. For example, the first deliverable ("360 video") calls for a 360 degree video of the product, the second deliverable ("360 with text") calls for a 360 degree product video with added text, the third deliverable ("Linear 3 features-X2") calls for two instances of a linear video that includes three features, the fourth deliverable ("Linear 5 features, 5 sec each") calls for a linear video that includes five features that are displayed for five seconds each, the fifth deliverable ("Feature image") calls for six instances of feature images, the sixth deliverable ("Interactive-Basic Menu 4 buttons") calls for an interactive video with a menu that includes four buttons, and the seventh deliverable ("Interactive-Video sequence with next button") calls for an interactive video sequence that includes a next button. At block 216, the post-production engine 102 obtains custom branding elements for the creation of the deliverables. The custom branding elements may include: company logos, product logos, retailer logos, style elements, signage, or any other elements that are specific to particular brands associated with the product. Likewise, the custom branding elements may include color schemes and font types that are specific to particular brands associated with the product. In some examples, the custom branding elements are provided by a user (e.g., a member of the production team, an end user of the deliverables, etc.). In such examples, the custom branding elements/requirements may be provided with (or included in) the requirement list 106. In some examples, the post-production engine 102 is configured to retrieve custom branding elements from the resource library 114.

At block 218, the post-production engine 102 integrates graphical elements and/or interactive elements with the artifacts. In some examples, the integration of the graphical and interactive elements is performed based on the requirement list 106. In some examples, the post-production engine 102 is configured to use the feature list 402 and the product representation metadata derived in step 208 when integrating the graphical and interactive elements with the artifacts. For example, when integrating an infographic into an artifact, the relevant text and information needed for the product representation may be pulled from the product representation metadata (or the product metadata). Likewise, the location of the infographic may be based on the location of the product representation, which may be pulled from the product representation metadata. In a similar manner, the post-production engine 102 may add labels, dimensions, arrows, technical details, animation, and other graphics using the product metadata and the product representation metadata.

Figure 10:
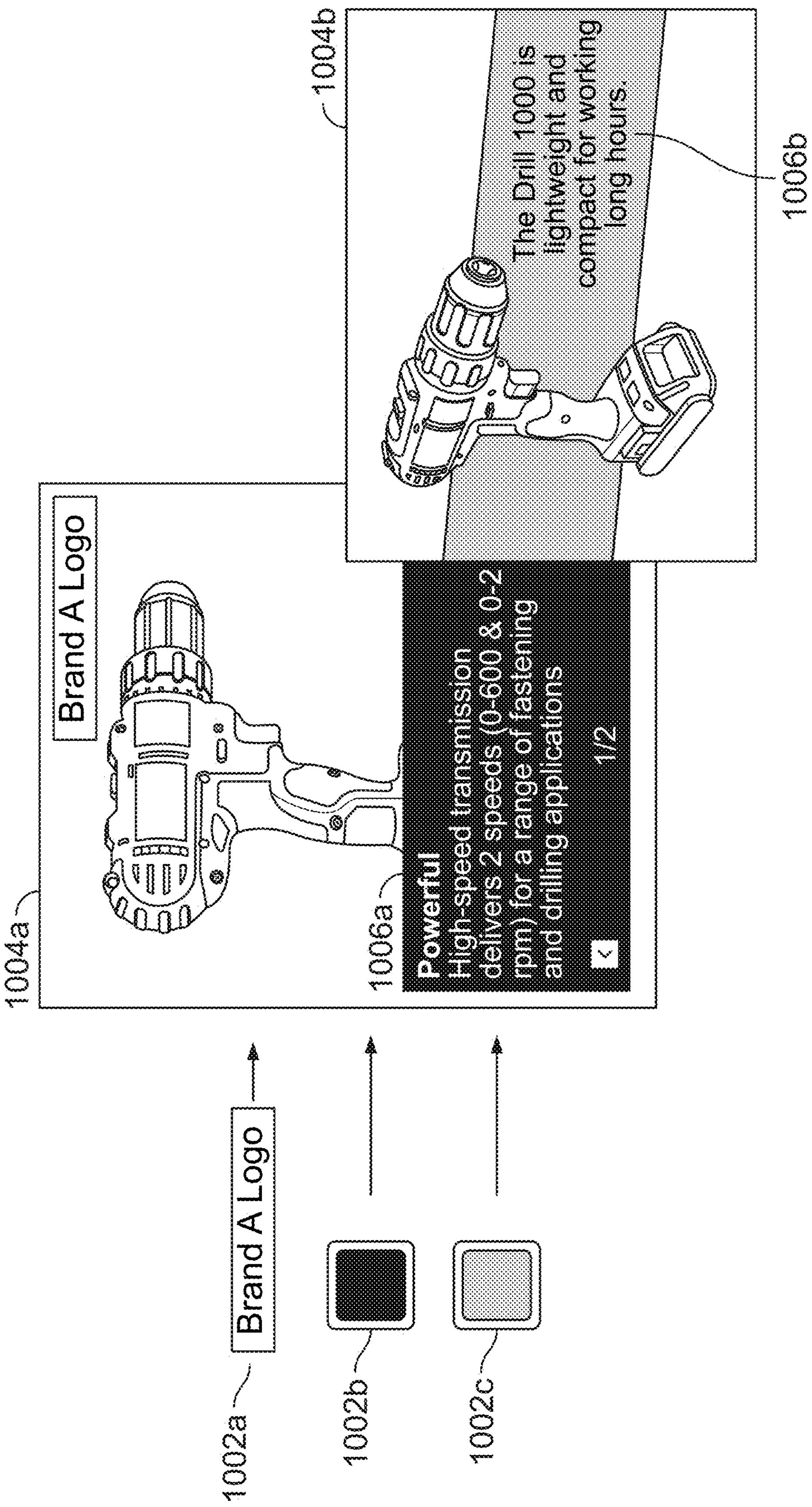
FIG. 10 illustrates example branding elements used to create artifacts in accordance with aspects described herein.

In some examples, the post-production engine 102 can add both static and moving infographics to the video artifacts. FIG. 10 illustrates an example of static infographics. As shown, a first deliverable 1004*a* includes a static infographic 1006*a* and a second deliverable 1004*b* includes a static infographic 1006*b*. In one example, the post-production engine 102 uses custom brand elements 1002 to generate the deliverables. For example, element 1002*a* is a logo integrated in deliverable 1004*a* and elements 1002*b*, 1002*c* correspond to a color scheme used to create infographics 1006*a*, 1006*b*.

Figure 11A:
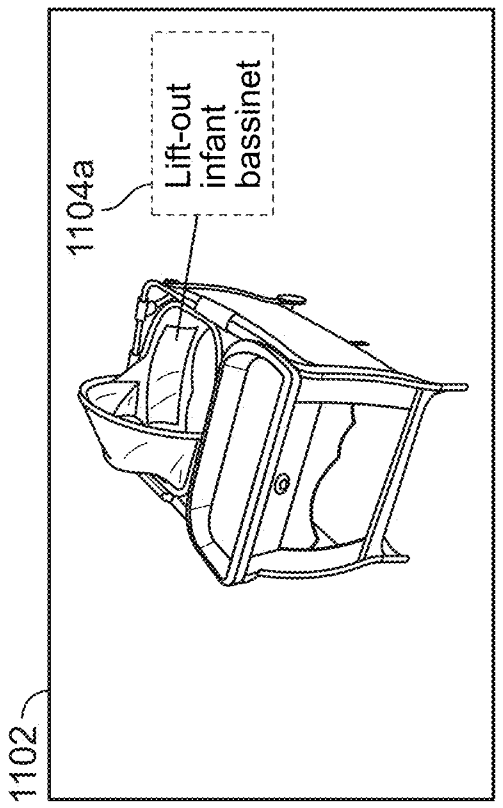
FIGS. 11A-11B illustrate an example video artifact in accordance with aspects described herein.
Figure 11B:
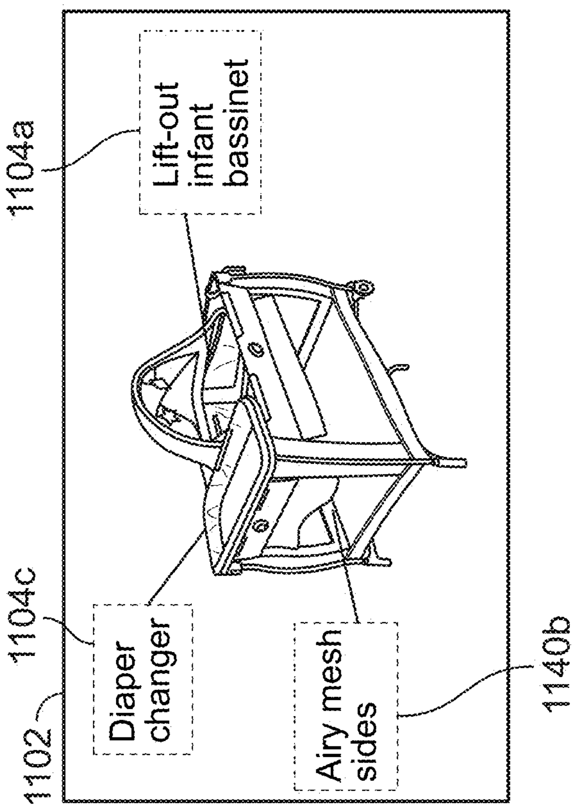
Figure 12A:
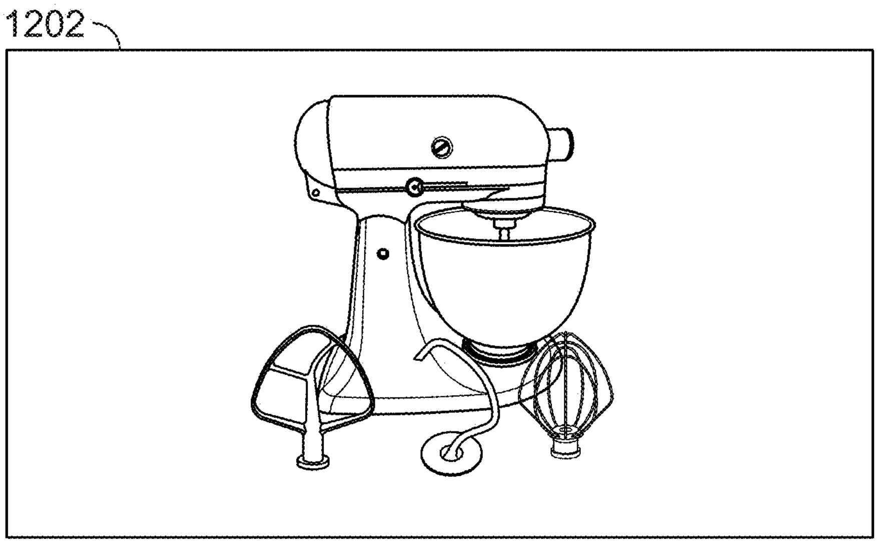
FIGS. 12A-12C illustrate an example video artifact in accordance with aspects described herein.
Figure 12B:
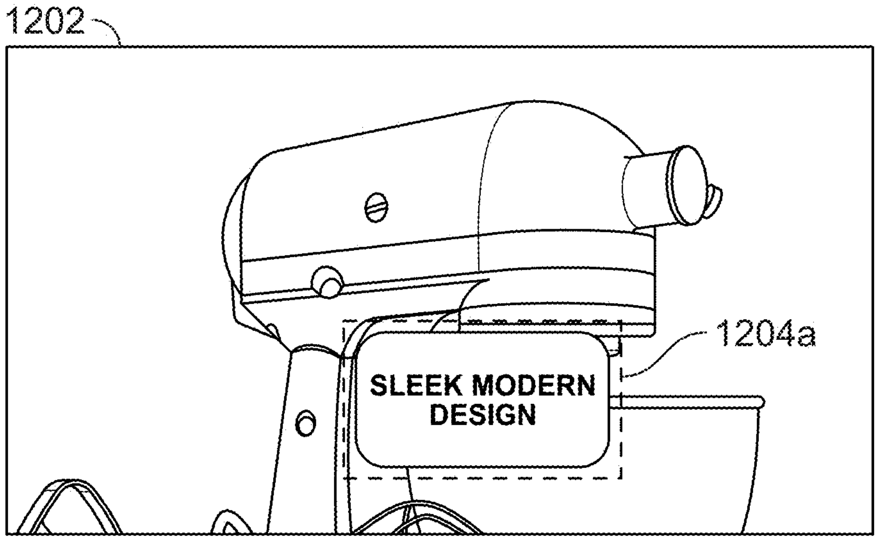
Figure 12C:
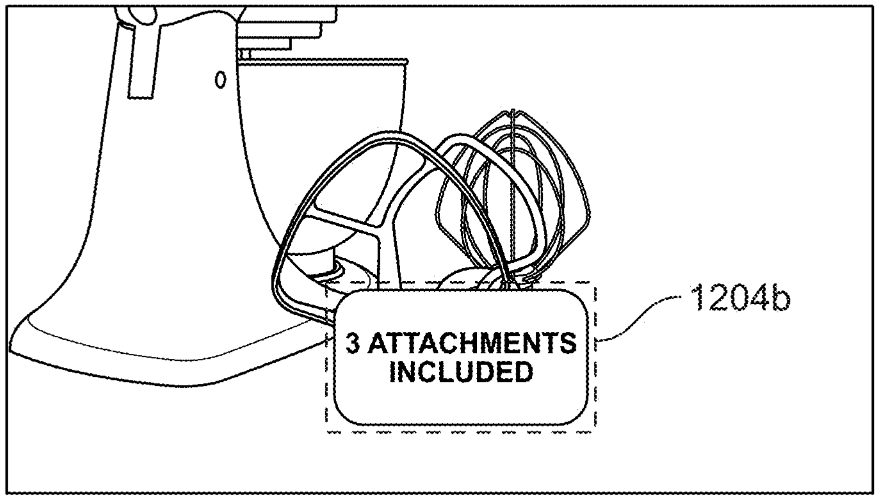
Figure 13B:
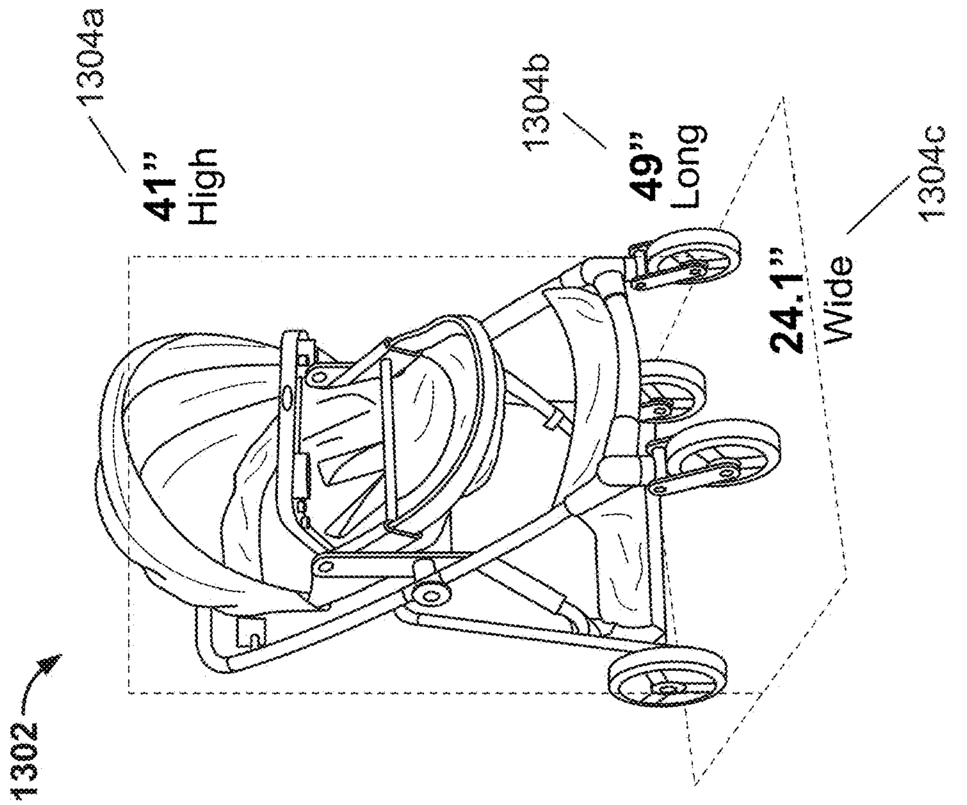
FIGS. 13A-13B illustrate an example video artifact in accordance with aspects described herein.
Figure 13A:
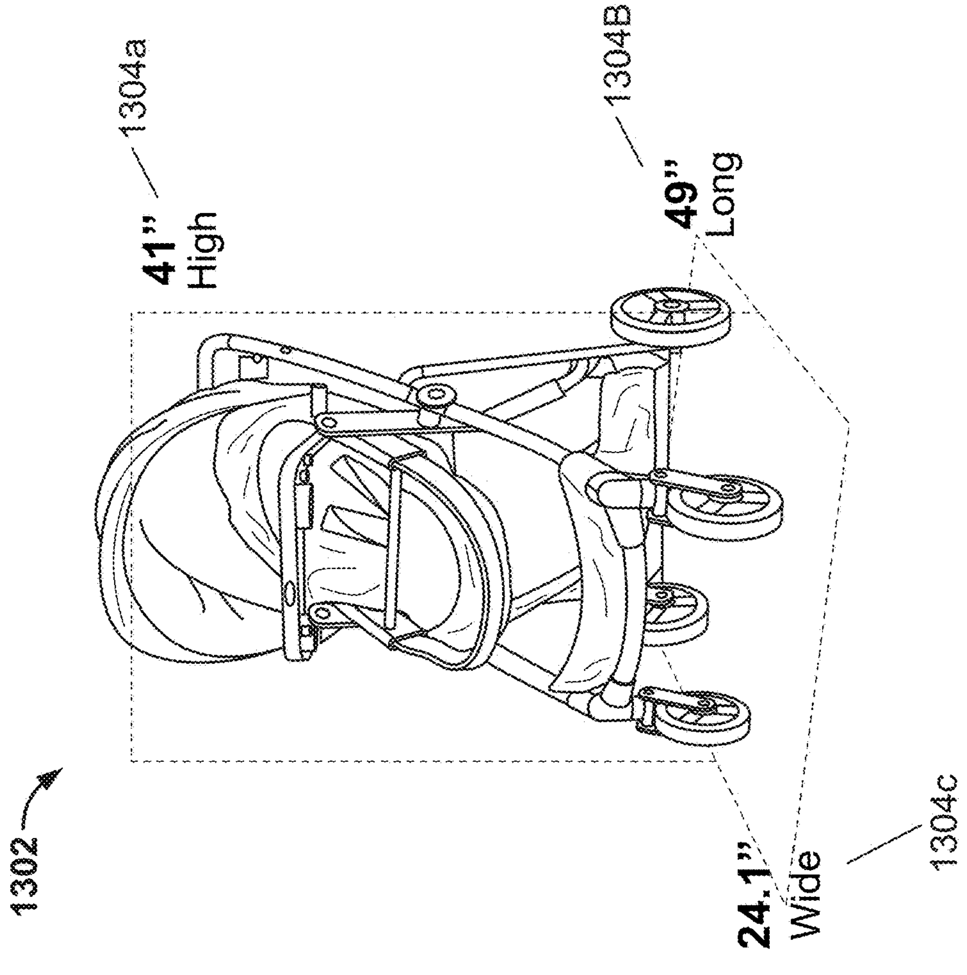

In some examples, the post-production engine 102 may utilize knowledge of the camera movement to integrate moving graphics relative to movement in the artifacts. For example, FIG. 11A illustrates a first snapshot of a video artifact 1102 having a moving infographic 1104*a*. FIG. 11B illustrates a second, subsequent snapshot of the video artifact 1102. As shown in FIG. 11B, the infographic 1104*a* has been repositioned relative to the movement in the video and new infographics 1104*b* and 1104*c* have appeared for product representations that became visible due to the movement in the video (i.e., the rotation of the product). Likewise, FIGS. 12A-12B illustrate another example of moving infographics. At the start of a video artifact 1202, there are no infographics visible (FIG. 12A). As the video zooms in to the product, a first infographic 1204*a* appears for a first product representation (FIG. 12B). Later in the video, a second infographic 1204*b* appears for a second product representation as the video rotates and zooms in to a different section of the product (FIG. 12C). Similarly, FIGS. 13A-13B illustrate a set of infographics 1304*a*, 1304*b*, and 1304*c* that move with the product in a video artifact 1302. For example, FIG. 13A illustrates a first snapshot of the video artifact 1302 and FIG. 13B illustrates a second, subsequent snapshot of the video artifact 1302. As shown in FIG. 13B, the infographics 1304 may be layered with respect to each other and the product in the video.

In some examples, the post-production engine 102 adds interactive elements to the artifacts to create interactive artifacts. In some examples, the post-production engine 102 creates interactive branched videos (or video trees). In some examples, the post-production engine 102 is configured to create interactive branched videos using predetermined templates. For example, the post-production engine 102 may select a template based on the type of product(s) being featured. The template may include a storyboard or sequence for the artifacts to be arranged based on the types of features that they represent. In some examples, the post-production engine 102 uses an interactive video template that includes predefined areas (or locations) for the interactive elements. The interactive elements may be added to an interactive layer of the artifacts. In some examples, the post-production engine 102 is configured to add the interactive elements based on the requirement list 106, the custom branding elements, the product metadata, the product representation metadata, or any combination thereof.

Figure 14:
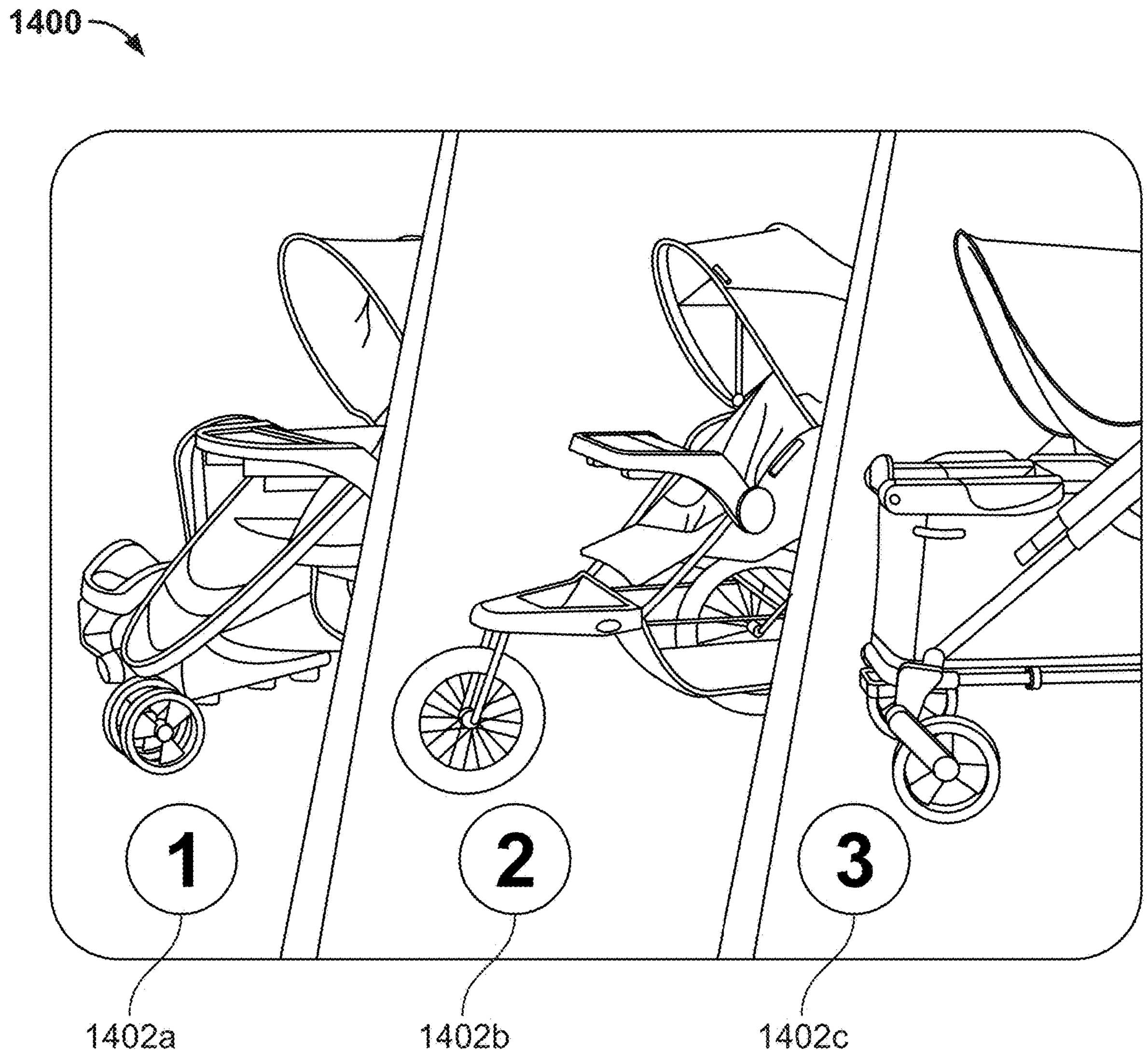
FIG. 14 illustrates an example interactive artifact in accordance with aspects described herein.
Figure 15:
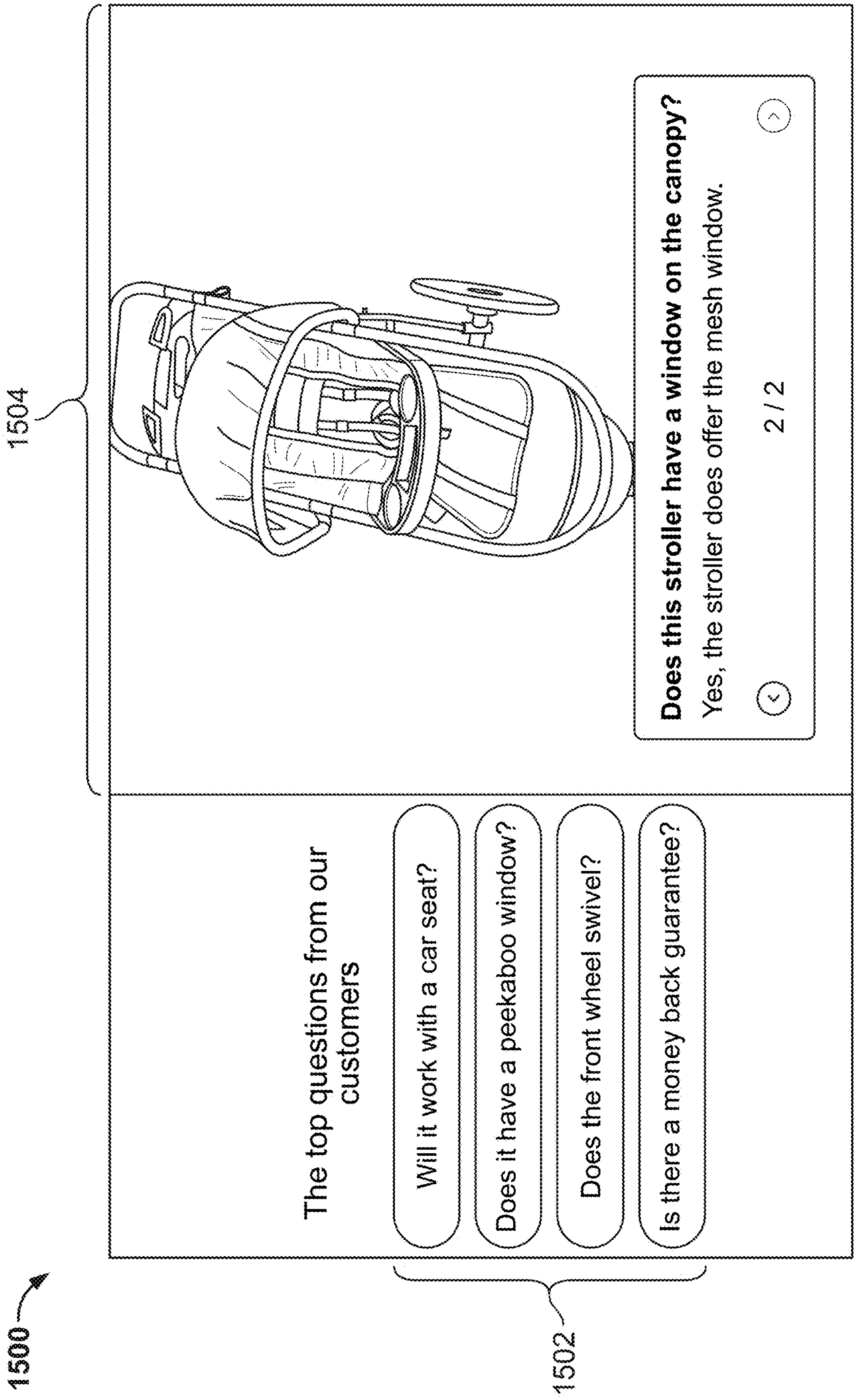
FIG. 15 illustrates an example interactive artifact in accordance with aspects described herein.

FIG. 14 illustrates an example snapshot of an interactive artifact 1400. In one example, the interactive artifact 1400 allows the viewer to compare features of similar products. As shown, the interactive artifact 1400 includes buttons 1402*a*, 1402*b*, and 1402*c* that allow the viewer to select between different versions of a product. Similarly, FIG. 15 illustrates an example snapshot of an interactive artifact 1500 that includes a plurality of questions 1502. In one example, the viewer may select different questions from the plurality of questions 1502 to view corresponding content 1504. In other examples, the post-production engine 102 may create interactive artifacts that include: a 360 degree video of a product including a selectable list of features, a video including a selectable list of product modes, and a video including questions that are used to filter a group of products based on the viewer's preferences.

In some examples, the post-production engine 102 is configured to present artifacts with integrated elements to the end user and/or the production team. In such examples, the end user and/or the production team may provide feedback that is used by the post-production engine 102 to revise, alter, or modify the elements and/or the artifacts. In some examples, the post-production engine 102 is configured to provide samples of the integrated artifacts to the end user and/or the production team. For example, the post-production engine 102 may present a plurality of sample artifacts that represent different variations of elements (e.g., different colors, styles, placement, etc.). In such examples, the end user and/or production team may select the sample (or samples) that represent preferred variations.

At block 220, the post-production engine 102 produces the final deliverables 108. The deliverables 108 are the final assets provided to the end user (e.g., the supplier of the requirement list 106). Each deliverable is created from one or more artifacts. As described above, the artifacts can include graphical elements and/or interactive elements. The deliverables can be pictures, videos, and/or interactive modules. In some examples, the final deliverables 108 include multiple deliverables of different media types (e.g., one picture and one video, one picture and two videos, etc.). The final deliverables 108 may be used for marketing purposes, web pages, PDPs, printing, interactive videos, and any other form of audio-visual presentation. Some examples of deliverables include: a video including all the artifacts that correspond to a product feature, a video showing different modes of a product feature (e.g., pouring espresso, americano, and cappuccino) all side-by-side in a video frame, an interactive video showing a 360 degree view of a product where a second video of a particular feature is displayed by clicking on the feature, a video showing all accessories for a product, a video advertisement demonstrating three product features where each feature has two individual videos, a collection of images or videos that have been formatted for different use cases (e.g., mobile vs. desktop, portrait vs. landscape, etc.), and an unboxing video that starts with a 360 degree view of the product packaging before transitioning to a 360 degree view of the unboxed product.

Figure 16A:
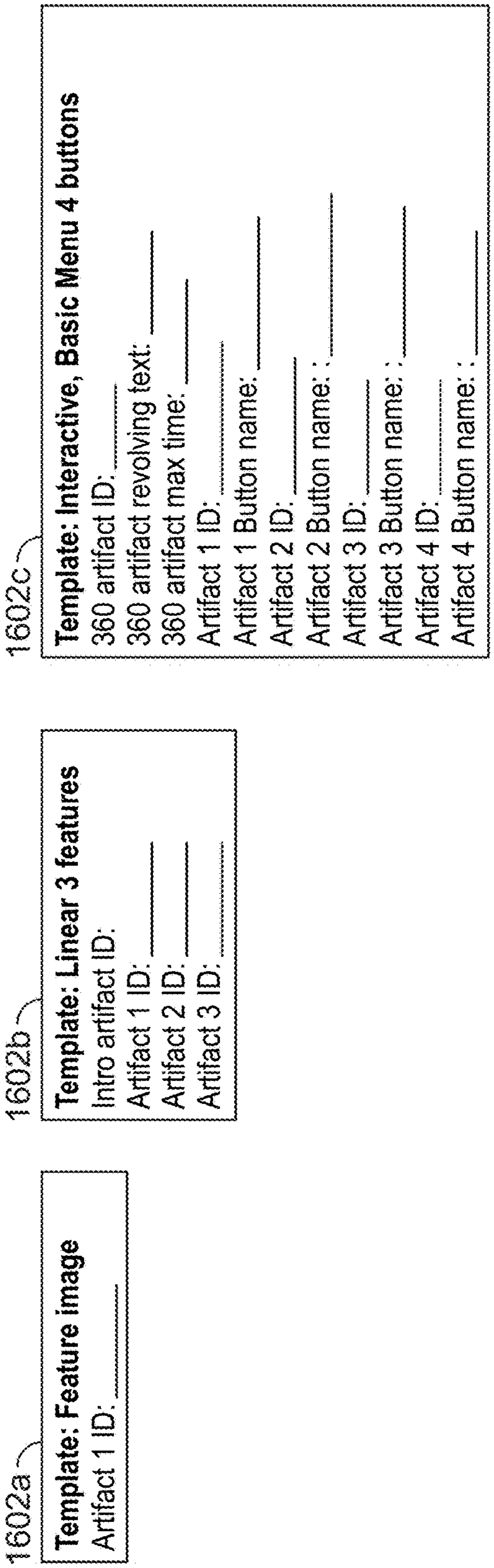
FIGS. 16A-16B illustrate examples of deliverable templates in accordance with aspects described herein.

In some examples, each deliverable type corresponds to a deliverable template that is referenced in the requirement list 106. FIG. 16A illustrates several examples of deliverable templates in accordance with aspects described herein. The first template 1602*a* corresponds to a "Feature image" deliverable (e.g., the fifth deliverable in requirement list 900 of FIG. 9). The first template 1602*a* includes a slot for an artifact assignment ("Artifact 1 ID"). The second template 1602*b* corresponds to a "Linear 3 features" template (e.g., the third deliverable in requirement list 900 of FIG. 9). The second template 1602*b* includes three slots for artifact assignments ("Artifact 1 ID", "Artifact 2 ID", and "Artifact 3 ID"). The third template 1602*c* corresponds to an "Interactive, Basic Menu 4 buttons" template (e.g., the sixth deliverable in requirement list 900 of FIG. 9). The third template 1602*c* includes a group of slots associated with a 360 degree artifact assignment ("360 artifact ID", "360 artifact revolving text", and "360 artifact max time"). In one example, the 360 degree artifact assignment corresponds to a 360 degree video artifact. Likewise, the third template 1602*c* includes a group of slots associated with a first artifact assignment ("Artifact 1 ID" and "Artifact 1 Button name"), a group of slots associated with a second artifact assignment ("Artifact 2 ID" and "Artifact 2 Button name"), a group of slots associated with a third artifact assignment ("Artifact 3 ID" and "Artifact 3 Button name"), and a group of slots associated with a fourth artifact assignment ("Artifact 4 ID" and "Artifact 4 Button name").

Figure 16B:
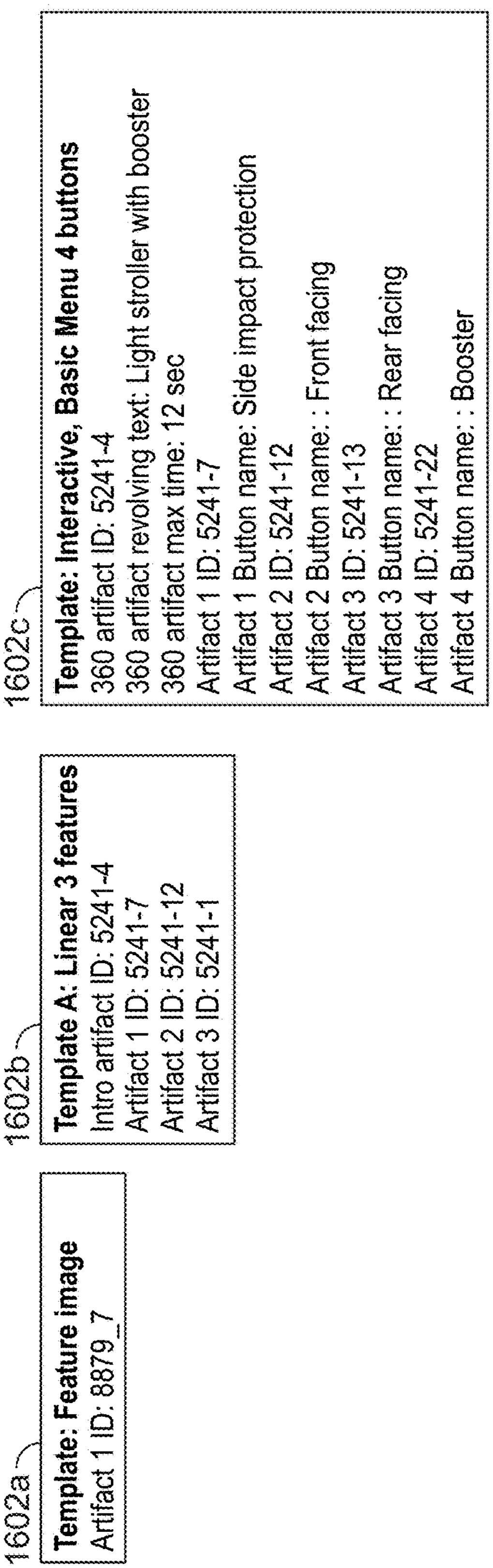

As shown in FIG. 16B, the templates 1602*a*-1602*c* may be completed to define the characteristics of each deliverable. For example, artifact IDs (e.g., 8879_7) are assigned to each artifact slot. Likewise, unique text is assigned to text slots and/or UI element slots (e.g., revolving text slots, button name slots, etc.). In some examples, numbers are assigned to numeric slots (e.g., max time slots). In some examples, the post-production engine 102 (or the AI model 103) is configured to automatically populate the template slots. In some examples, the template slots are populated based on a combination of the types of artifacts available, the product representation metadata, and any rules provided in the requirement list. In some examples, the post-production engine 102 is configured to populate the templates based on randomly selected features. For example, if a template requires three features (e.g., template 1602*b*), the post-production engine 102 may assign three randomly selected features to the template. In some examples, the post-production engine 102 is configured to populate the templates based on the priority of individual features. For example, if a template requires three features (e.g., template 1602*b*), the post-production engine 102 may assign the three most prioritized (or relevant) features to the template. In some examples, the post-production engine 102 is configured to populate the templates by assigning content to template slots. For example, when a button is associated with an artifact, the button may automatically be assigned the name of the feature that is represented by the artifact. In some examples, the AI model 103 may be used to generate additional text for populating the template. For example, the AI model 103 may generate text based on a feature name (or description) that is added to the template (e.g., revolving text, buttons, etc.). In some examples, the templates may be populated, at least in part, by a user (e.g., via UI 116).

Figure 17C:
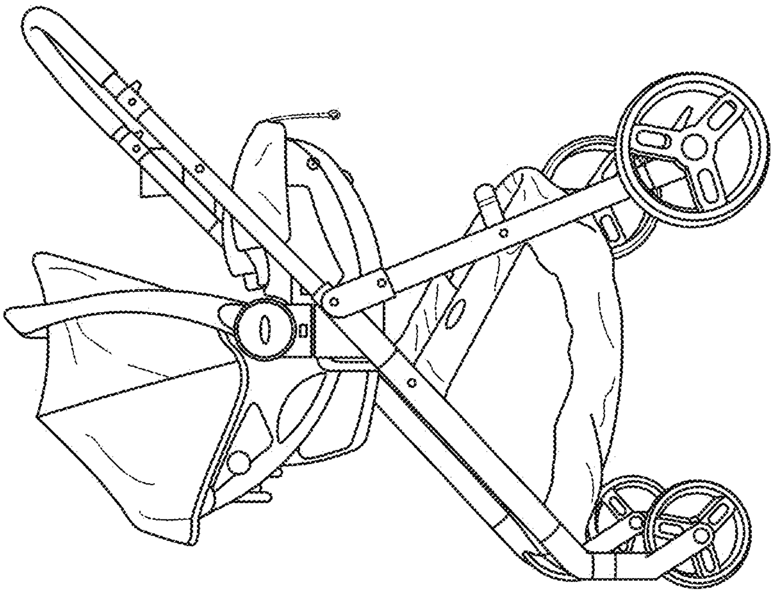
FIGS. 17A-17C illustrate an example deliverable in accordance with aspects described herein.
Figure 17B:
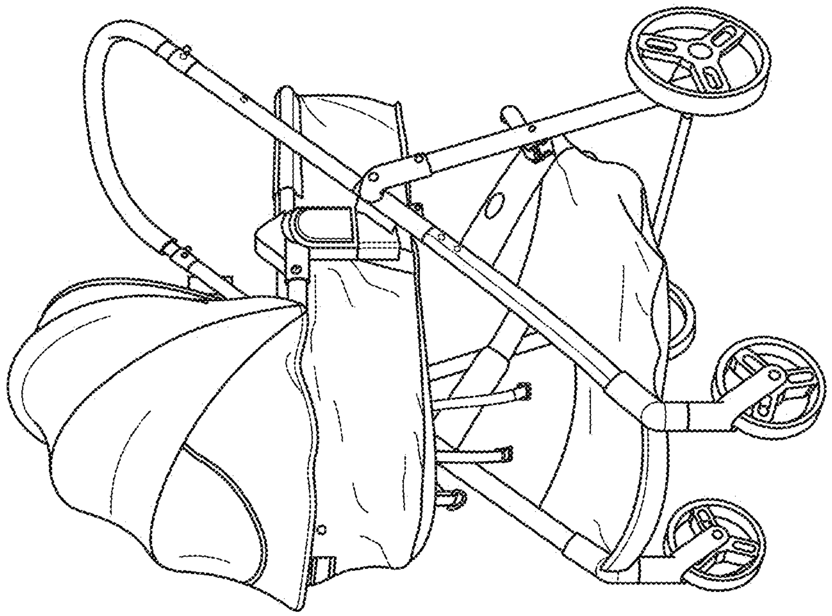
Figure 17A:
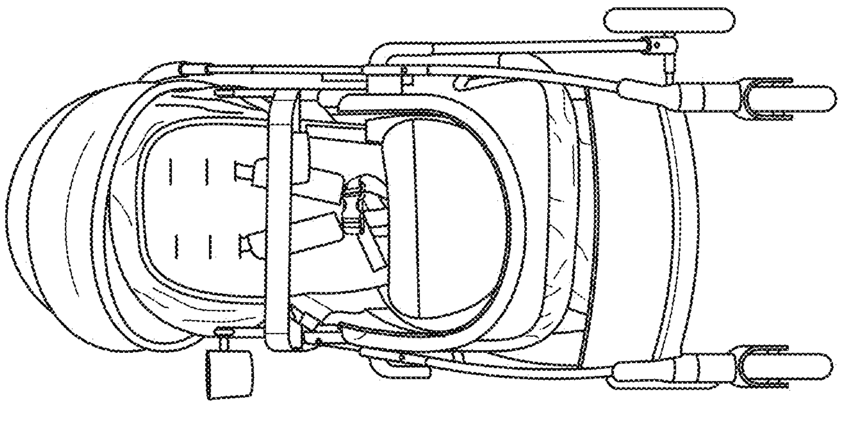
Figure 18B:
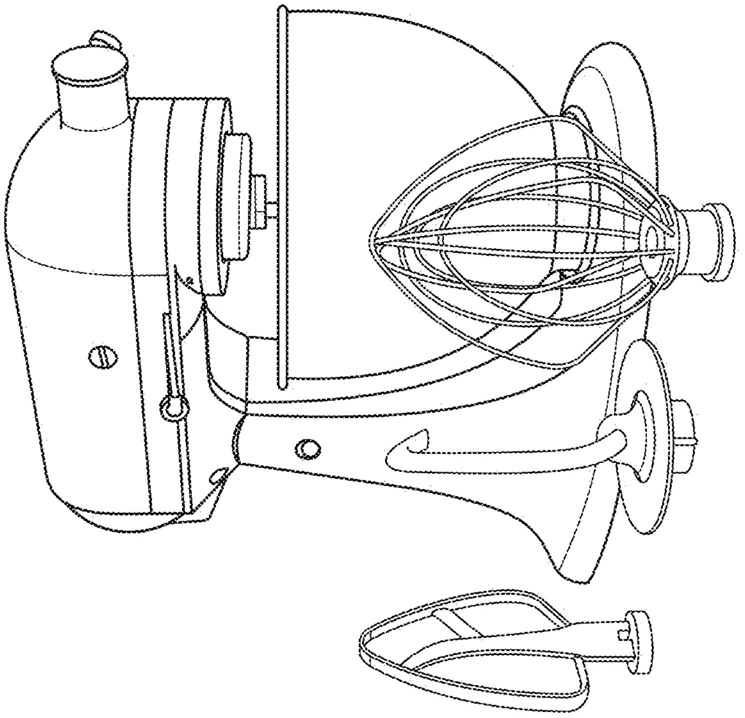
FIGS. 18A-18B illustrate an example video artifact in accordance with aspects described herein.
Figure 18A:
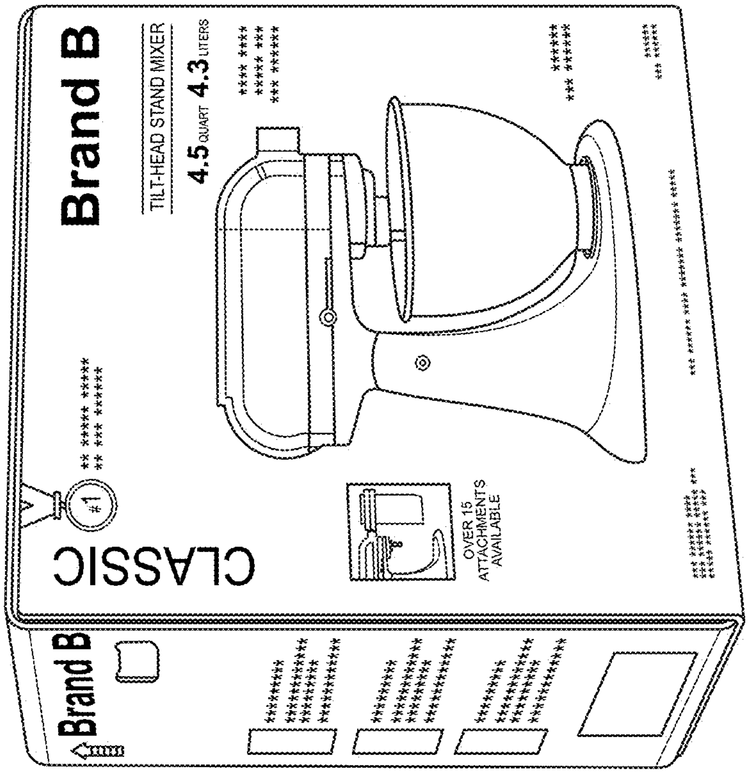

FIGS. 17A-17C illustrate snapshots of a video deliverable 1700. As shown, the product is rotated while different features (or modes) of the product are demonstrated. In some examples, the product rotation is automatic. In other examples, the viewer may control the rotation of the product (e.g., via a mouse or touchscreen). Similarly, FIGS. 18A, 18B illustrate snapshots of a video deliverable 1800. At the start of the video, a 360 degree view of the product packaging is shown (FIG. 18A), before transitioning to a 360 degree view of the product (FIG. 18B).

It should be appreciated that the video editing system 100 may be re-run using the same raw video footage 104 or the same requirement list 106. For example, a new requirement list 106 may be provided to create deliverables (and artifacts) for the same raw video footage 104. Likewise, new raw video footage 104 may be provided with the same requirement list 106 to create similar deliverables (and artifacts) for different products/brands. In one example, if the end user wants to focus on a product feature that was captured in the raw video footage 104 but wasn't defined as a feature before, the user can add the feature to the feature list (e.g., feature list 402 of FIG. 4). Once added, the feature extraction process (step 208) can be re-run and the post-production engine 102 will automatically create artifacts and deliverables for the new feature. In some examples, it is beneficial for the end user to re-run the system 100 to compare the artifacts and deliverables generated for similar products or similar footage for the same product(s). In some examples, the system 100 may be re-run when a new type of deliverable is created or developed.

Hardware and Software Implementations

Figure 19:
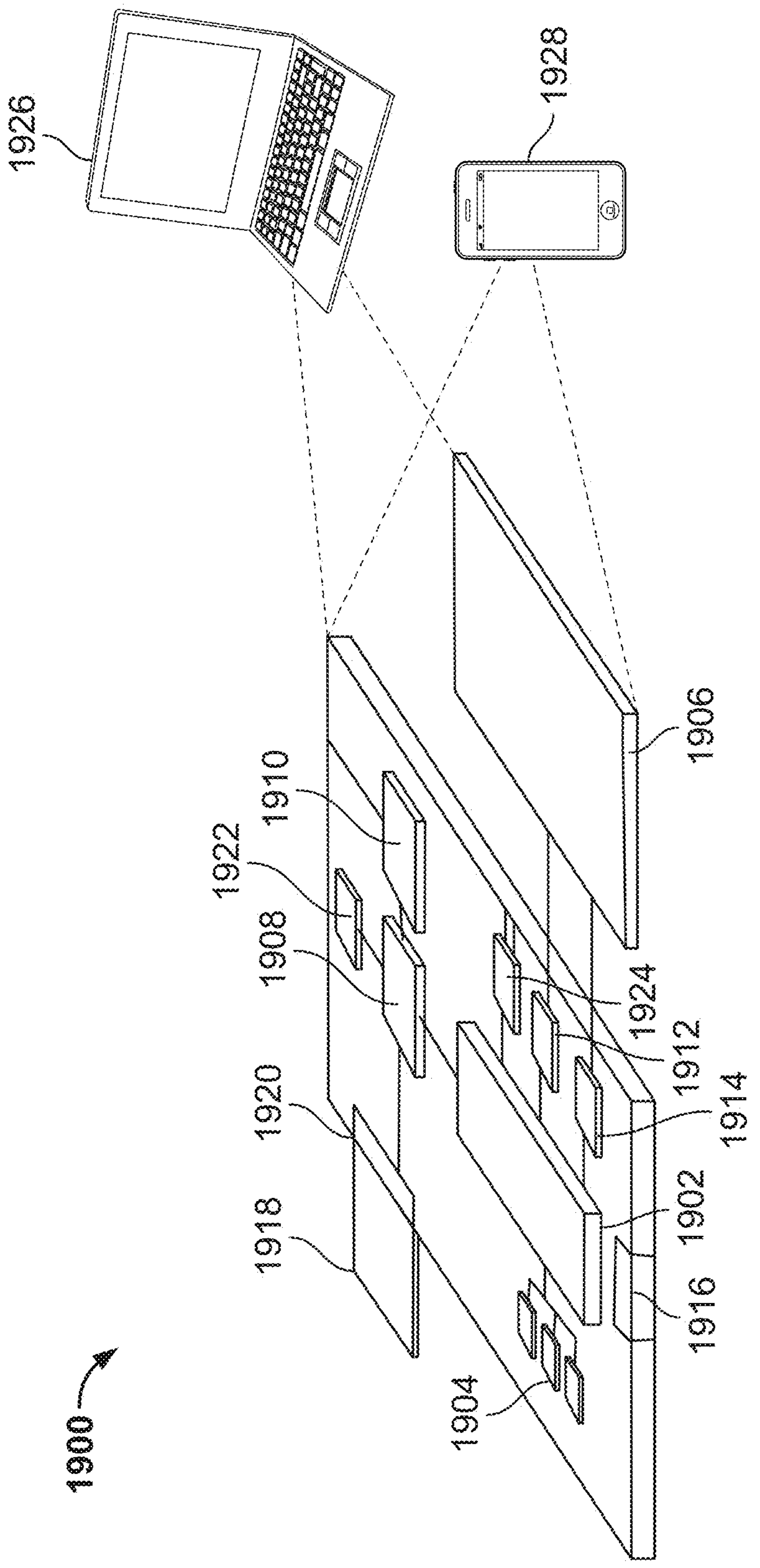
FIG. 19 illustrates an example computing device.

FIG. 19 shows an example of a generic computing device 1900, which may be used with some of the techniques described in this disclosure (e.g., to implement the post-production engine 102). Computing device 1900 includes a processor 1902, memory 1904, an input/output device such as a display 1906, a communication interface 1908, and a transceiver 1910, among other components. The device 1900 may also be provided with a storage device, such as a micro-drive or other device, to provide additional storage. Each of the components 1900, 1902, 1904, 1906, 1908, and 1910, are interconnected using various buses, and several of the components may be mounted on a common motherboard or in other manners as appropriate.

The processor 1902 can execute instructions within the computing device 1900, including instructions stored in the memory 1904. The processor 1902 may be implemented as a chipset of chips that include separate and multiple analog and digital processors. The processor 1902 may provide, for example, for coordination of the other components of the device 1900, such as control of user interfaces, applications run by device 1900, and wireless communication by device 1900.

Processor 1902 may communicate with a user through control interface 1912 and display interface 1914 coupled to a display 1906. The display 1906 may be, for example, a TFT LCD (Thin-Film-Transistor Liquid Crystal Display) or an OLED (Organic Light Emitting Diode) display, or other appropriate display technology. The display interface 1914 may comprise appropriate circuitry for driving the display 1906 to present graphical and other information to a user. The control interface 1912 may receive commands from a user and convert them for submission to the processor 1902. In addition, an external interface 1916 may be provided in communication with processor 1902, so as to enable near area communication of device 1900 with other devices. External interface 1916 may provide, for example, for wired communication in some implementations, or for wireless communication in other implementations, and multiple interfaces may also be used.

The memory 1904 stores information within the computing device 1900. The memory 1904 can be implemented as one or more of a computer-readable medium or media, a volatile memory unit or units, or a non-volatile memory unit or units. Expansion memory 1918 may also be provided and connected to device 1900 through expansion interface 1920, which may include, for example, a SIMM (Single In Line Memory Module) card interface. Such expansion memory 1918 may provide extra storage space for device 1900, or may also store applications or other information for device 1900. Specifically, expansion memory 1918 may include instructions to carry out or supplement the processes described above, and may include secure information also. Thus, for example, expansion memory 1918 may be provided as a security module for device 1900, and may be programmed with instructions that permit secure use of device 1900. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 1904, expansion memory 1918, memory on processor 1902, or a propagated signal that may be received, for example, over transceiver 1410 or external interface 1916.

Device 1900 may communicate wirelessly through communication interface 1908, which may include digital signal processing circuitry where necessary. Communication interface 1908 may in some cases be a cellular modem. Communication interface 1908 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 1910. In addition, short-range communication may occur, such as using a Bluetooth, WiFi, or other such transceiver (not shown). In addition, GPS (Global Positioning System) receiver module 1922 may provide additional navigation- and location-related wireless data to device 1900, which may be used as appropriate by applications running on device 1900.

Device 1900 may also communicate audibly using audio codec 1924, which may receive spoken information from a user and convert it to usable digital information. Audio codec 1924 may likewise generate audible sound for a user, such as through a speaker, e.g., in a handset of device 1900. Such sound may include sound from voice telephone calls, may include recorded sound (e.g., voice messages, music files, etc.) and may also include sound generated by applications operating on device 1900. In some examples, the device 1900 includes a microphone to collect audio (e.g., speech) from a user. Likewise, the device 1900 may include an input to receive a connection from an external microphone.

The computing device 1900 may be implemented in a number of different forms, as shown in FIG. 19. For example, it may be implemented as a computer (e.g., laptop) 1926. It may also be implemented as part of a smartphone 1928, smart watch, tablet, personal digital assistant, or other similar mobile device.

Some implementations of the subject matter and the operations described in this specification can be implemented in digital electronic circuitry, or in computer software, firmware, or hardware, including the structures disclosed in this specification and their structural equivalents, or in combinations of one or more of them. Implementations of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a standalone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language resource), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending resources to and receiving resources from a device that is used by the user; for example, by sending web pages to a web browser on a user's client device in response to requests received from the web browser.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some implementations, a server transmits data (e.g., an HTML page) to a client device (e.g., for purposes of displaying data to and receiving user input from a user interacting with the client device). Data generated at the client device (e.g., a result of the user interaction) can be received from the client device at the server.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method for providing automatic editing of a product video, the method comprising:

receiving product video footage associated with a product;

generating a feature list including a plurality of product features;

assigning different portions of the product video footage to each product feature of the plurality of product features;

creating a plurality of product artifacts from the portions of the product video footage assigned to each of the plurality of product features;

storing the plurality of product artifacts in at least one database;

receiving a deliverable requirement list indicating (i) a plurality of media deliverables to generate for the product, wherein at least two of the plurality of media deliverables are of different mediums, and (ii) at least one product feature;

retrieving, from the at least one database, at least one product artifact of the plurality of product artifacts associated with the at least one product feature; and generating the plurality of media deliverables using the at least one retrieved product artifact in accordance with the deliverable requirement list.

2. The method of claim 1, wherein generating the feature list includes receiving product metadata corresponding to the plurality of product features and generating the feature list based on the product metadata.

3. The method of claim 1, wherein generating the feature list includes analyzing the product video footage to derive product metadata corresponding to the plurality of product features and generating the feature list based on the product metadata.

4. The method of claim 1, wherein assigning different portions of the product video footage to each product feature of the plurality of product features includes assigning at least one timecode of the product video footage to each product feature of the plurality of product features.

5. The method of claim 1, wherein assigning different portions of the product video footage to each product feature of the plurality of product features includes assigning at least one video coordinate of the product video footage to each product feature of the plurality of product features.

6. The method of claim 5, wherein the at least one video coordinate indicates a region of the product video footage where the corresponding product feature is displayed.

7. The method of claim 6, further comprising:

assigning dimensions of a box to the at least one video coordinate.

8. The method of claim 7, wherein the box encompasses a region of the product video footage where the corresponding product feature is displayed.

9. The method of claim 1, wherein generating the plurality of media deliverables using the plurality of product artifacts based on the deliverable requirement list includes integrating at least one infographic with at least one product artifact.

10. The method of claim 1, wherein generating the plurality of media deliverables using the plurality of product artifacts based on the deliverable requirement list includes integrating at least one interactive element with at least one product artifact.

11. The method of claim 1, wherein at least one of the plurality of media deliverables includes at least one image.

12. The method of claim 1, wherein at least one of the plurality of media deliverables includes at least one video.

13. The method of claim 1, wherein at least one of the plurality of media deliverables includes at least one interactive video.

14. The method of claim 1, wherein at least one of the plurality of media deliverables includes two or more product artifacts from the plurality of product artifacts arranged in a sequence.

15. A system for automatically editing product video footage, the system comprising:

at least one memory for storing computer-executable instructions; and at least one processor for executing the instructions stored on the at least one memory, wherein execution of the instructions programs the at least one processor to perform operations comprising:

receiving product video footage associated with a product;

generating a feature list including a plurality of product features;

assigning different portions of the product video footage to each product feature of the plurality of product features;

creating a plurality of product artifacts from the portions of the product video footage assigned to each of the plurality of product features;

storing the plurality of product artifacts in at least one database;

receiving a deliverable requirement list indicating (i) a plurality of media deliverables to generate for the product, wherein at least two of the plurality of media deliverables are of different mediums, and (ii) at least one product feature;

retrieving, from the at least one database, at least one product artifact of the plurality of product artifacts associated with the at least one product feature; and generating the plurality of media deliverables using the at least one retrieved product artifact in accordance with the deliverable requirement list.

16. The system of claim 15, wherein generating the feature list includes receiving product metadata corresponding to the plurality of product features and generating the feature list based on the product metadata.

17. The system of claim 15, wherein generating the feature list includes analyzing the product video footage to derive product metadata corresponding to the plurality of product features and generating the feature list based on the product metadata.

18. The system of claim 15, wherein assigning different portions of the product video footage to each product feature of the plurality of product features includes assigning at least one timecode of the product video footage to each product feature of the plurality of product features.

19. The system of claim 15, wherein assigning different portions of the product video footage to each product feature of the plurality of features includes assigning at least one video coordinate of the product video footage to each product feature of the plurality of product features.

20. The system of claim 19, wherein the at least one video coordinate indicates a region of the product video footage where the corresponding product feature is displayed.

21. The system of claim 20, wherein execution of the instructions programs the at least one processor to perform operations further comprising:

assigning dimensions of a box to the at least one video coordinate.

22. The system of claim 21, wherein the box encompasses a region of the product video footage where the corresponding product feature is displayed.

23. The system of claim 15, wherein generating the plurality of media deliverables using the plurality of product artifacts based on the deliverable requirement list includes integrating at least one infographic with at least one product artifact.

24. The system of claim 15, wherein generating the plurality of media deliverables using the plurality of product artifacts based on the deliverable requirement list includes integrating at least one interactive element with at least one product artifact.

25. The system of claim 15, wherein at least one of the plurality of media deliverables includes at least one image.

26. The system of claim 15, wherein at least one of the plurality of media deliverables includes at least one video.

27. The system of claim 15, wherein at least one of the plurality of media deliverables includes at least one interactive video.

28. The system of claim 15, wherein at least one of the plurality of media deliverables includes two or more product artifacts from the plurality of product artifacts arranged in a sequence.

* * * * *